US012669835B2

(12) United States Patent
Di Cairano et al.

(10) Patent No.: US 12,669,835 B2
(45) Date of Patent: Jun. 30, 2026

(54) DISTRIBUTED MOTION PLANNING AND CONTROL OF AUTONOMOUS GROUND AND AERIAL VEHICLES

(71) Applicant: Mitsubishi Electric Research Laboratories, Inc., Cambridge, MA (US)

(72) Inventors: Stefano Di Cairano, Newton, MA (US); Taewan Kim, Seattle, WA (US); Abraham Vinod, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 105 days.

(21) Appl. No.: 18/761,360

(22) Filed: Jul. 2, 2024

(65) Prior Publication Data

US 2026/0010179 A1 Jan. 8, 2026

(51) Int. Cl.
*G05D 1/692* (2024.01)
*B60P 3/11* (2006.01)
(Continued)

(52) U.S. Cl.
CPC ............... *G05D 1/692* (2024.01); *B60P 3/11* (2013.01); *B60W 60/0025* (2020.02); *B64U 80/86* (2023.01); *G05D 1/644* (2024.01); *B64U 2101/31* (2023.01); *B64U 2101/32* (2023.01); *B64U 2101/56* (2023.01); *B64U 2101/64* (2023.01); *B64U 2201/10* (2023.01); *G05D 2109/10* (2024.01); *G05D 2109/20* (2024.01)

(58) Field of Classification Search
CPC .... G05D 1/692; G05D 1/644; G05D 2109/10; G05D 2109/20; B60P 3/11; B60W 60/0025; B64U 80/86; B64U 2101/31; B64U 2101/32; B64U 2101/56; B64U 2101/64; B64U 2201/10
See application file for complete search history.

(56) References Cited

U.S. PATENT DOCUMENTS

2018/0158018 A1* 6/2018 Luckay ................. B64C 39/024
2019/0220819 A1* 7/2019 Banvait .............. G01C 21/3453

OTHER PUBLICATIONS

N. Mathew, S. L. Smith and S. L. Waslander, "Multirobot Rendezvous Planning for Recharging in Persistent Tasks," in IEEE Transactions on Robotics, vol. 31, No. 1, pp. 128-142, Feb. 2015, doi: 10.1109/TRO.2014.2380593. (Year: 2015).*

(Continued)

*Primary Examiner* — Navid Z. Mehdizadeh
*Assistant Examiner* — Shelley Marie Osterhout
(74) *Attorney, Agent, or Firm* — Gene Vinokur

(57) ABSTRACT

An autonomous ground vehicle (AGV) carrying one or multiple unmanned aerial vehicles (UAVs) to perform one or multiple tasks necessitating visiting one or multiple target locations is controlled by determining a reachable set defining a region of space including a target location for performing the task and a difference between a launch time span for launching the UAV and a recovery time span recovering the UAV. The AGV motion trajectory prescribes the AGV to be in a launch location within the reachable set at a launch time within the launch time span and in a recovery location within the reachable set at a recovery time within the recovery time span subject to a constraint on the difference between the launch time span and the recovery time span.

20 Claims, 24 Drawing Sheets

(51) Int. Cl.

| | |
|---|---|
| *B60W 60/00* | (2020.01) |
| *B64U 80/86* | (2023.01) |
| *B64U 101/31* | (2023.01) |
| *B64U 101/32* | (2023.01) |
| *B64U 101/56* | (2023.01) |
| *B64U 101/64* | (2023.01) |
| *G05D 1/644* | (2024.01) |
| *G05D 109/10* | (2024.01) |
| *G05D 109/20* | (2024.01) |

(56) References Cited

OTHER PUBLICATIONS

Y. Ding, B. Xin, and J. Chen, "A review of recent advances in coordination between unmanned aerial and ground vehicles," Unmanned Systems, vol. 9, No. 02, pp. 97-117, 2021.

K. Yu, A. K. Budhiraja, S. Buebel, and P. Tokekar, "Algorithms and experiments on routing of unmanned aerial vehicles with mobile recharging stations," J. Field Rob., vol. 36, No. 3, pp. 602-616, 2019.

* cited by examiner

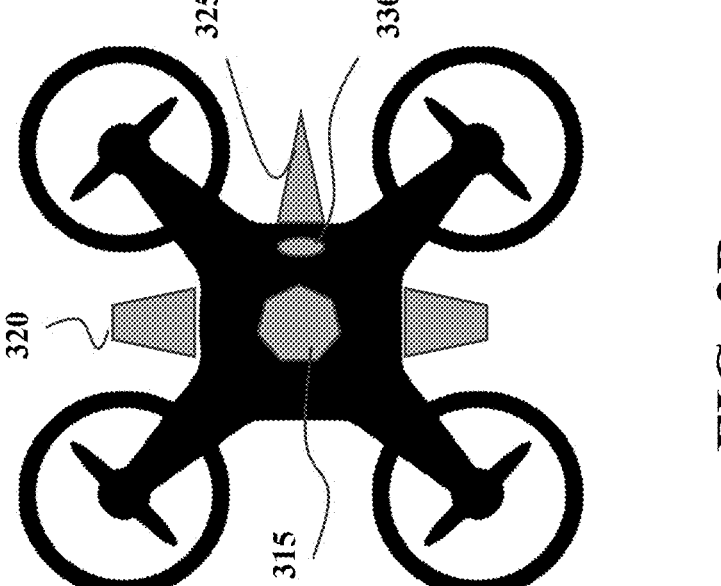
FIG. 3B

Figure 4:
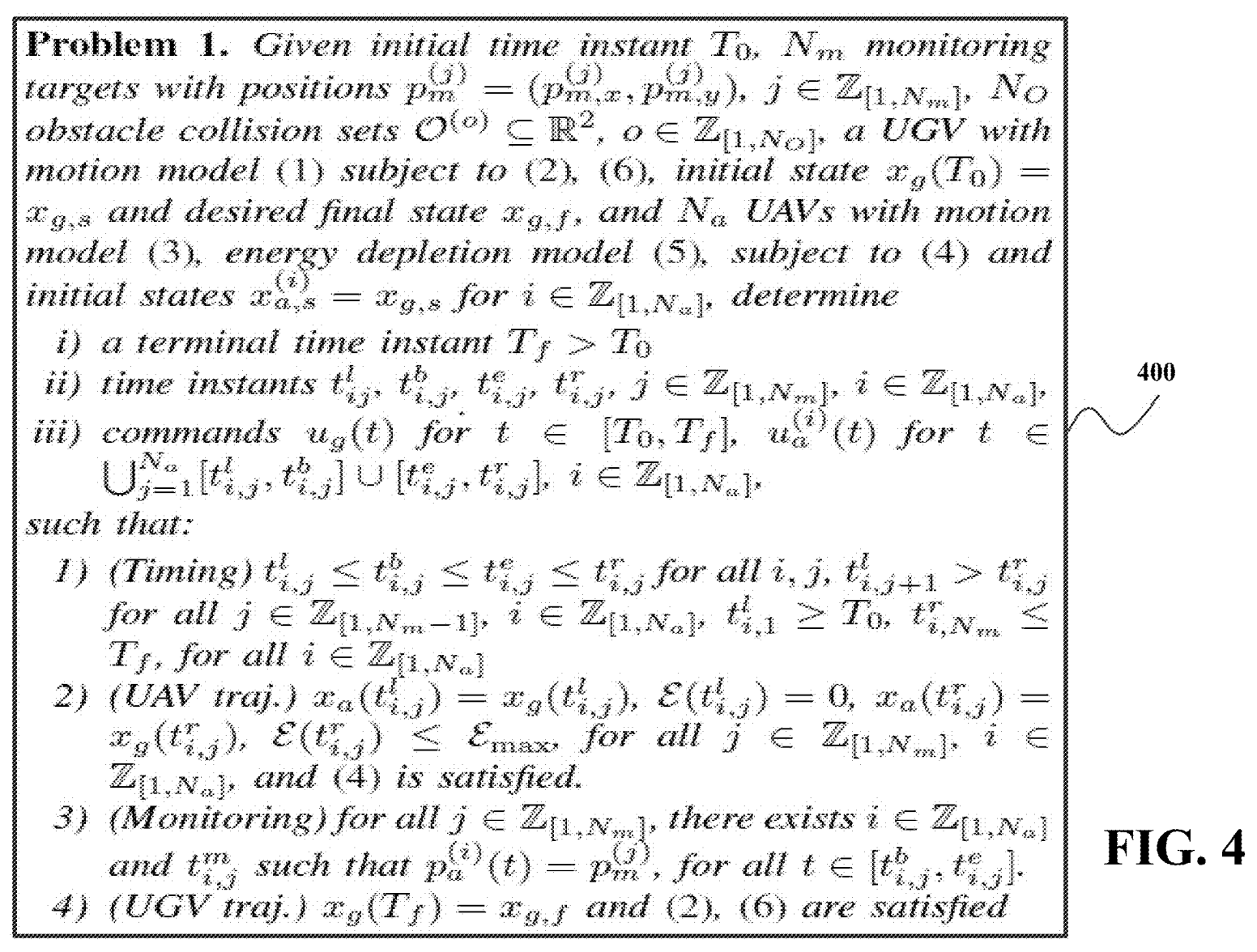

Problem 1. *Given initial time instant $T_0$, $N_m$ monitoring targets with positions $p_m^{(j)} = (p_{m,x}^{(j)}, p_{m,y}^{(j)})$, $j \in \mathbb{Z}_{[1,N_m]}$, $N_0$ obstacle collision sets $O^{(o)} \subseteq \mathbb{R}^2$, $o \in \mathbb{Z}_{[1,N_0]}$, a UGV with motion model (1) subject to (2), (6), initial state $x_g(T_0) = x_{g,s}$ and desired final state $x_{g,f}$, and $N_a$ UAVs with motion model (3), energy depletion model (5), subject to (4) and initial states $x_{a,s}^{(i)} = x_{g,s}$ for $i \in \mathbb{Z}_{[1,N_a]}$, determine*

*i) a terminal time instant $T_f > T_0$*

*ii) time instants $t_{i,j}^l$, $t_{i,j}^b$, $t_{i,j}^e$, $t_{i,j}^r$, $j \in \mathbb{Z}_{[1,N_m]}$, $i \in \mathbb{Z}_{[1,N_a]}$*

*iii) commands $u_g(t)$ for $t \in [T_0, T_f]$, $u_a^{(i)}(t)$ for $t \in \bigcup_{j=1}^{N_a}[t_{i,j}^l, t_{i,j}^b] \cup [t_{i,j}^e, t_{i,j}^r]$, $i \in \mathbb{Z}_{[1,N_a]}$*

*such that:*

*1) (Timing) $t_{i,j}^l \le t_{i,j}^b \le t_{i,j}^e \le t_{i,j}^r$ for all $i,j$, $t_{i,j+1}^l > t_{i,j}^r$ for all $i,j$, $t_{i,j+1}^l > t_{i,j}^r$ for all $j$, $t_{i,1}^l \ge T_0$, $t_{i,N_m}^r \le T_f$, for all $i \in \mathbb{Z}_{[1,N_a]}$.*

*2) (UAV traj.) $x_a(t_{i,j}^b) = x_g(t_{i,j}^b)$, $x_a(t_{i,j}^e) = x_g(t_{i,j}^e)$, $\mathcal{E}(t_{i,j}^l) = 0$, $x_a(t_{i,j}^r) = x_g(t_{i,j}^r)$, $\mathcal{E}(t_{i,j}^b) \le \mathcal{E}_{max}$ for all $j \in \mathbb{Z}_{[1,N_m]}$, $i \in \mathbb{Z}_{[1,N_a]}$, and (4) is satisfied.*

*3) (Monitoring) for all $j \in \mathbb{Z}_{[1,N_m]}$, there exists $i \in \mathbb{Z}_{[1,N_a]}$ and $t_{i,j}^m$ such that $p_a^{(i)}(t) = p_m^{(j)}$, for all $t \in [t_{i,j}^b; t_{i,j}^e]$.*

*4) (UGV traj.) $x_g(T_f) = x_{g,f}$ and (2), (6) are satisfied*

1350 determining a current level of an energy capacity 1360 comparing the current level of the energy capacity with allocated energy budget 1370 updating the energy budget and the reachable set of the subsequent task $$\min \quad F(t_f) + \int_0^{t_f} L(x_g(t), u_g(t))dt$$

$$\text{s.t.} \quad \dot{x}_g(t) = f_g(x_g(t), u_g(t))$$

$$g(x_g(t), u_g(t)) \leq 0$$

$$\mathcal{V}_e(x_g(t_g^l) - x_m) \leq \gamma_{d(e)}^l$$

$$\mathcal{V}_c(x_g(t_g^l) - x_m) \leq 1$$

$$\mathcal{V}_e(x_g(t_g^r + \tau) - x_m) \leq \gamma_{d(e)}^r$$

$$\mathcal{V}_c(x_g(t_g^r + \tau) - x_m) \leq 1$$

$$\gamma_{d(e)}^l + \gamma_{d(e)}^r \leq E_{d(e)}(t^l) - E_r^M$$

DISTRIBUTED MOTION PLANNING AND CONTROL OF AUTONOMOUS GROUND AND AERIAL VEHICLES

TECHNICAL FIELD

This invention is related to planning for a group of mobile robots with heterogeneous characteristics, such as autonomous ground vehicles and unmanned aerial vehicles.

BACKGROUND

Unmanned Aerial Vehicles (UAVs) are used across the world for civilian and commercial missions. Examples of missions of the UAVs may include, but are not limited to, aerial photography missions, delivery services missions, mapping and surveying missions, infrastructure inspection missions, disaster response missions, search and rescue missions, and aviation missions. Of particular interest for the use of UAV are monitoring missions where a certain target must be monitored by electromagnetic or optical sensor e.g., for detecting need of maintenance and in general status.

Recently, utilization of UAVs in various missions has increased due to UAVs' advantages over missions performed by ground vehicles such as reduction of traffic congestion and access to areas to which the services by ground vehicles are limited. Such areas may include mountainous terrain, remote camping locations, crowded cities, and the like. However, UAVs have some limitations when compared with autonomous ground vehicles (AGVs). For example, large unmanned aerial vehicles (UAVs) are expensive and potentially dangerous (should they crash), while small UAVs lack the range to reach the monitoring area or operate in the region where the targets are for a long time.

Hence, to achieve complex tasks, such as the periodic monitoring and/or mapping of multiple targets in remote areas, it may be convenient to combine heterogeneous robots, such as autonomous ground vehicles and unmanned aerial vehicles. For example, it is possible to envision an AGV, for instance, gas-powered or with large batteries and solar panels, that can operate in the target region for a long time, and then deploy small UAVs that reach the targets and perform the monitoring, When the small UAVs need recharging, they rendezvous with the AGVs that provides battery charging. However, planning the motion of a robot that is slow and subject to natural barriers, but with long/almost unlimited range (such as AGV) deploying and recovering task-performing robots that are fast and not subject to natural barriers (such as UAV), but with limited range over long mission is potentially challenging.

Accordingly, there is a need in the art for a method for planning motion and controlling groups of mobile robots with heterogeneous characteristics, such as autonomous ground vehicles and unmanned aerial vehicles to jointly perform one or multiple tasks.

SUMMARY

It is an object of some embodiments to plan motion and/or control an autonomous ground vehicle (AGV) carrying one or multiple unmanned aerial vehicles (UAVs) to perform one or multiple tasks necessitating visiting one or multiple target locations over an uncertain duration by one or multiple UAVs. Additionally or alternatively, it is an object of some embodiments to decouple control of the AGV and UAV while allowing both the AGV and UAVs to jointly perform a task. Additionally or alternatively, it is an object of some embodiments to jointly control the operation of the AGV and UAVs to perform a task that may be performed over an uncertain duration and may require an uncertain amount of energy spent by a UAV for its completion.

To decouple the control of AGV and UAV while allowing both the AGV and UAVs to jointly perform a task, some embodiments use the connection of the state space of the dynamical system and energy of the dynamical system embodied in but not limited to levels of Lyapunov functions. Some embodiments are based on the realization that because the AGV and UAV share a part of the state space, specifically the position, the control of the AGV performed in the common part of the state space can be used to constrain the energy depletion of the UAV through the levels of the Lyapunov function of UAV's dynamics. This realization allows decoupling the control of the AGV and UAV to perform a task jointly by using the motion of the AGV as an energy constraint on the operation of the UAV. Such a connection makes the operation of the UAV dependent on the motion of the AGV in a flexible manner that allows independent optimization of the motion of the UAV from optimization of the motion of the AGV.

A Lyapunov function is a scalar function that can be used to analyze the stability of an equilibrium point of a dynamical system. Some embodiments are based on the recognition that the Lyapunov function can be solved to estimate its level sets. In the context of Lyapunov functions, a "level set" refers to a set of points in the state space of a dynamical system where the Lyapunov function takes a particular value. In other words, for a Lyapunov function $V(x)$, the level set of V at a constant value c is the set of all points x in the state space such that $V(x)=c$.

When an equilibrium point of the Lyapunov function of dynamics of a UAV is aligned with a target location of a task, level set c defines the value of energy with respect to a special energy function, needed for the UAV to cover a distance between the target location and state space corresponding to level set c. Such energy function normally would not be the actual energy of the UAV. Because the AGV and UAV share the state space, if the state space corresponding to level set c intersects the motion trajectory of the AGV, it is guaranteed that the UAV can reach the AGV at the point of intersection by spending the amount of energy defined by level c. Accordingly, to guarantee that the UAV has sufficient energy for traversing between the AGV and the target location, there is a need to find the level set of the Lyapunov function of dynamics of a UAV defining a segment of space intersecting the AGV trajectory when an equilibrium point of the Lyapunov function is aligned with a target location of a task. Doing this in such a manner allows controlling the motion of the AGV according to the AGV trajectory while instructing the UAV to perform the task according to its own computations subject to one or a combination of energy constraints governed by the level set of Lyapunov function and time constraints governed by a time instance of the segment of space intersecting the AGV trajectory.

Such an understanding enables using an energy budget specified for the performance of each task and the energy model of the motion of the UAV to perform the motion planning of the UAV subject to the energy budget and energy model of the UAV, and after that to use the planned UAV motion as a constraint to plan the motion of the AGV.

Hence, in various embodiments, the reachable sets are determined based on the energy model of the UAV. However, in addition to using the energy model to determine the reachable sets, the embodiments are based on recognizing that the energy model can also be used to estimate launch and recovery time spans within the reachable set allowing a UAV to reach the target location, perform a task spending energy predetermined for the type of the task, and reach a border of the reachable set for being recovered, i.e., picked up, by the AGV.

For example, some embodiments are based on realizing that the connection between AGV and UAV motion is the recovery and launch operations. For these operations, the limitation is the range of the UAVs. Hence, the motion plan of AGVs and UAVs can be decoupled by determining the regions that the UAVs can reach based on their remaining range. The regions can be formulated as constraints, and include also other limitations, such as the UAV's speed and acceleration. Then, to ensure a safe recovery, the range-dependent constraints can be included in a motion planning problem for the UAVs alone, imposing crossing for at least a time window of a certain length. The problem returns an AGV trajectory and a return range threshold for UAVs such that, if the UAV returns to the AGV before the energy (range is for energy) is below the threshold in a way that reaches the AGV trajectory in the appropriate window, then rendezvous will safely occur with the available range. Thus, the UAVs can now safely plan their return motion. When the range reaches the lower threshold or when the timing is such that the UAVs reach the AGV at the end of the time window, the UAVs start moving towards AGV. Then, rendezvous will occur, and the UAV can be recharged by the AGV. A similar approach can be used for launching decisions, where the range regions are now centered on the target, and the AGV motion is imposed to enter the regions from which the UAVs can reach the target within a range. Once AGV trajectory is decided, re-optimization of UAV trajectory one-by-one is possible which may further reduce range consumption, thus enabling longer time spent executing the mission at the target.

Accordingly, one embodiment discloses a method for controlling an autonomous ground vehicle (AGV) carrying one or multiple unmanned aerial vehicles (UAVs) to perform one or multiple tasks necessitating visiting one or multiple target locations, wherein the method uses a processor coupled with stored instructions implementing the method, wherein the instructions, when executed by the processor carry out steps of the method, including collecting energy budgets for each of the one or multiple tasks to be performed by each of the one or multiple UAVs; determining, for each of the tasks based on an energy budget collected for a task and an energy model of a UAV assigned to the task, a reachable set defining a region of space including a target location for performing the task that enables the UAV located in the reachable set to reach the target location, spent a predetermined energy for performing the task and exit the reachable set while staying within the energy budget and operating within a safe envelope of flight conditions; determining, based on the energy model of the UAV, a difference between a launch time span and a recovery time span of the UAV based on dimensions of the reachable set and time allocated for the performance of the task corresponding to the energy predetermined for the task; determining an AGV motion trajectory as a function of time and space prescribing the AGV to be in a launch location within the reachable set at a launch time within the launch time span and in a recovery location within the reachable set at a recovery time within the recovery time span subject to constraints including a constraint on the difference between the launch time span and the recovery time span; and controlling the AGV according to the AGV motion trajectory while commanding the UAV to perform the task upon reaching the launch location at the launch time and collecting the UAV in the recovery location at the recovery time.

For example, in some implementations, the reachable set is an intersection of a Lyapunov stability set defined by a first Lyapunov function and a Lyapunov energy set defined by a second Lyapunov function, wherein the Lyapunov stability set is determined for a feedback controller of the UAV and flight constraints defining the safe envelope of flight conditions such that the UAV located within the Lyapunov stability set under the control of the feedback controller reaches an equilibrium for a sublevel set of the first Lyapunov function while satisfying the flight constraints, and wherein the Lyapunov energy set is determined for a sublevel set of the second Lyapunov function describes energy usage of the UAV controlled by the feedback controller according to the energy model of the UAV, wherein a value of the sublevel set is determined by the energy budget.

Another embodiment discloses an autonomous ground vehicle (AGV) configured for carrying one or multiple unmanned aerial vehicles (UAVs) to perform one or multiple tasks necessitating visiting one or multiple target locations, wherein the AGV includes a processor coupled with stored instructions, wherein the instructions, when executed by the processor, cause the processor to: collect energy budgets for each of the one or multiple tasks to be performed by each of the one or multiple UAVs; determine, for each of the tasks based on an energy budget collected for a task and an energy model of a UAV assigned to the task, a reachable set defining a region of space including a target location for performing the task that enables the UAV located in the reachable set to reach the target location, spent predetermined energy for performing the task and exit the reachable set while staying within the energy budget and operating within a safe envelope of flight conditions; determine, based on the energy model of the UAV, a difference between a launch time and a recovery time of the UAV based on dimensions of the reachable set and time allocated for the performance of the task corresponding to the energy predetermined for the task; determine an AGV motion trajectory as a function of time and space prescribing the AGV to be in a launch location within the reachable set at the launch time and in a recovery location within the reachable set at the recovery time subject to a constraint on the difference between the launch time and the recovery time; and control the AGV according to the AGV motion trajectory while commanding the UAV to perform the task upon reaching the launch location at the launch time and collecting the UAV in the recovery location at the recovery time.

Yet another embodiment discloses a non-transitory computer-readable storage medium and embodied thereon a program executable by a processor performing a method for controlling an autonomous ground vehicle (AGV) carrying one or multiple unmanned aerial vehicles (UAVs) to perform one or multiple tasks necessitating visiting one or multiple target locations, the method including: collecting energy budgets for each of the one or multiple tasks to be performed by each of the one or multiple UAVs; determining, for each of the tasks based on an energy budget collected for a task and an energy model of a UAV assigned to the task, a reachable set defining a region of space including a target location for performing the task that enables the UAV located in the reachable set to reach the target location, spent predetermined energy for performing the task and exit the reachable set while staying within the energy budget and operating within a safe envelope of flight conditions; determining, based on the energy model of the UAV, a difference between a launch time and a recovery time of the UAV based on dimensions of the reachable set and time allocated for the performance of the task corresponding to the energy predetermined for the task; determining an AGV motion trajectory as a function of time and space prescribing the AGV to be in a launch location within the reachable set at the launch time and in a recovery location within the reachable set at the recovery time subject to a constraint on the difference between the launch time and the recovery time; and controlling the AGV according to the AGV motion trajectory while commanding the UAV to perform the task upon reaching the launch location at the launch time and collecting the UAV in the recovery location at the recovery time.

BRIEF DESCRIPTION OF THE DRAWINGS

Figure 1:
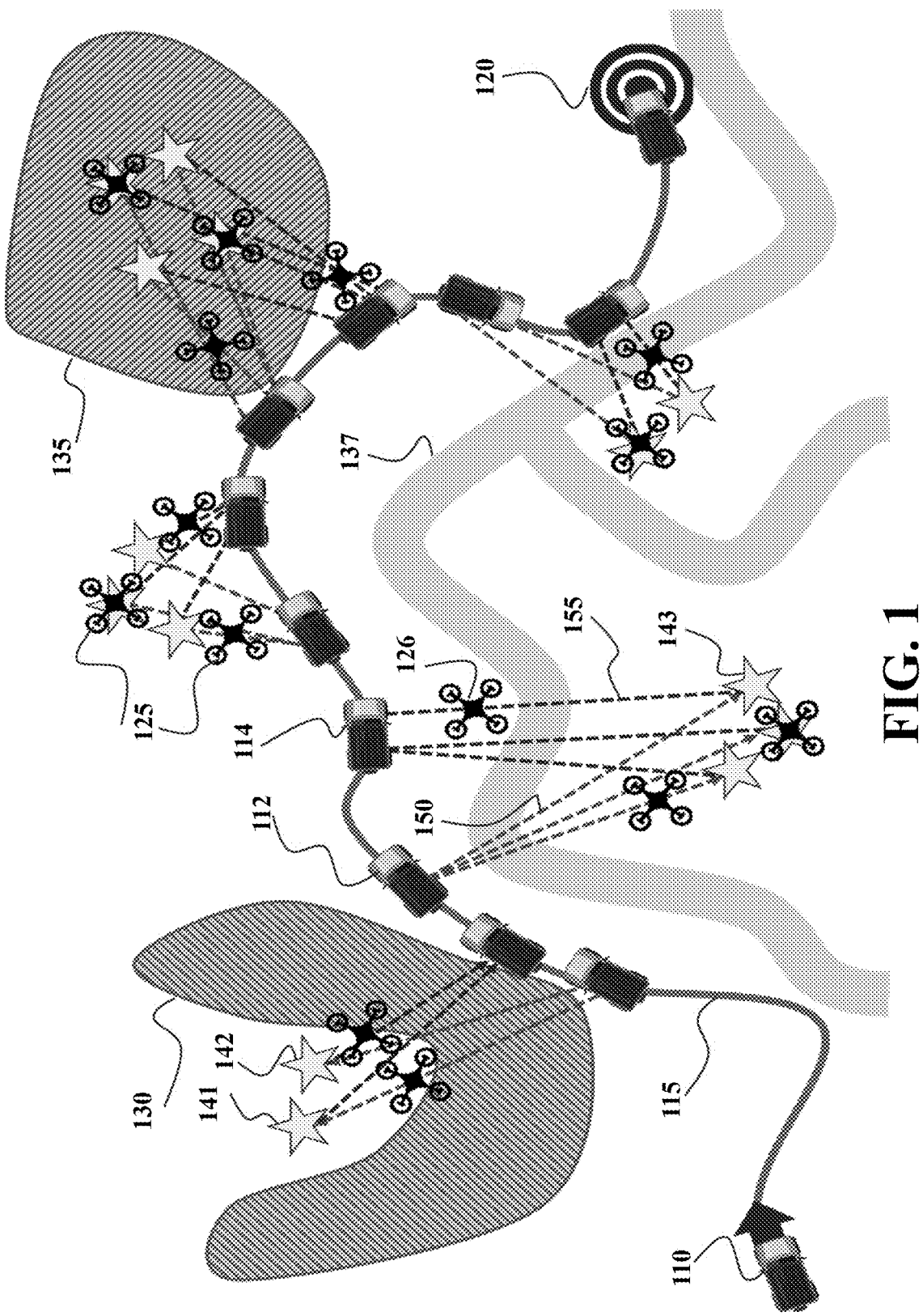

Having thus described example embodiments of the disclosure in general terms, reference will now be made to the accompanying drawings, which are not necessarily drawn to scale, and wherein:

FIG. 1 shows an exemplar schematic of controlling an AGV carrying one or multiple UAVs to perform one or multiple tasks necessitating visiting one or multiple target locations according to some embodiments.

Figure 2A:
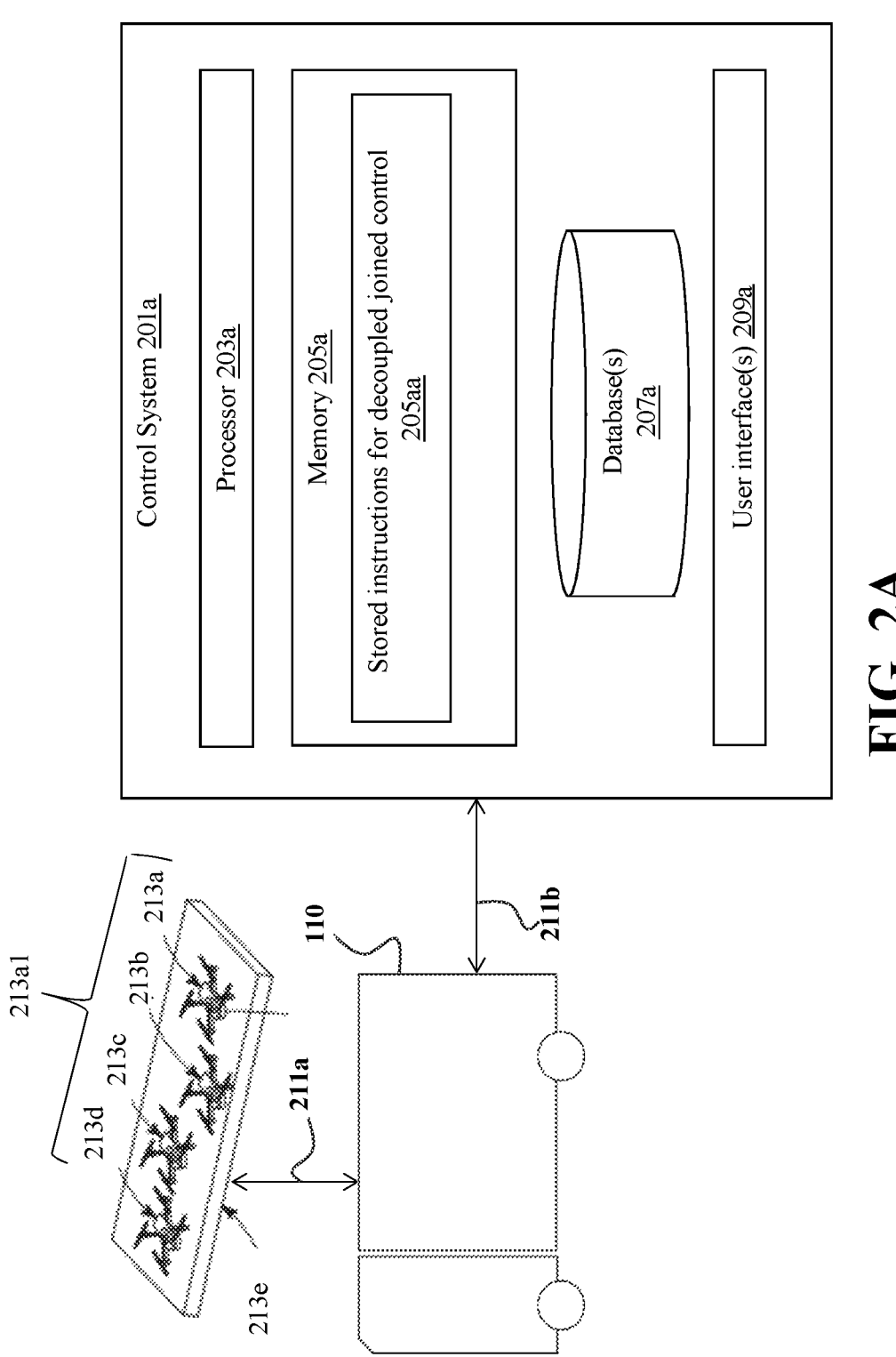

FIG. 2A shows a schematic of a control system implemented on the AGV for controlling a fleet of Unmanned Aerial Vehicles (UAVs), in accordance with an example embodiment.

Figure 2B:
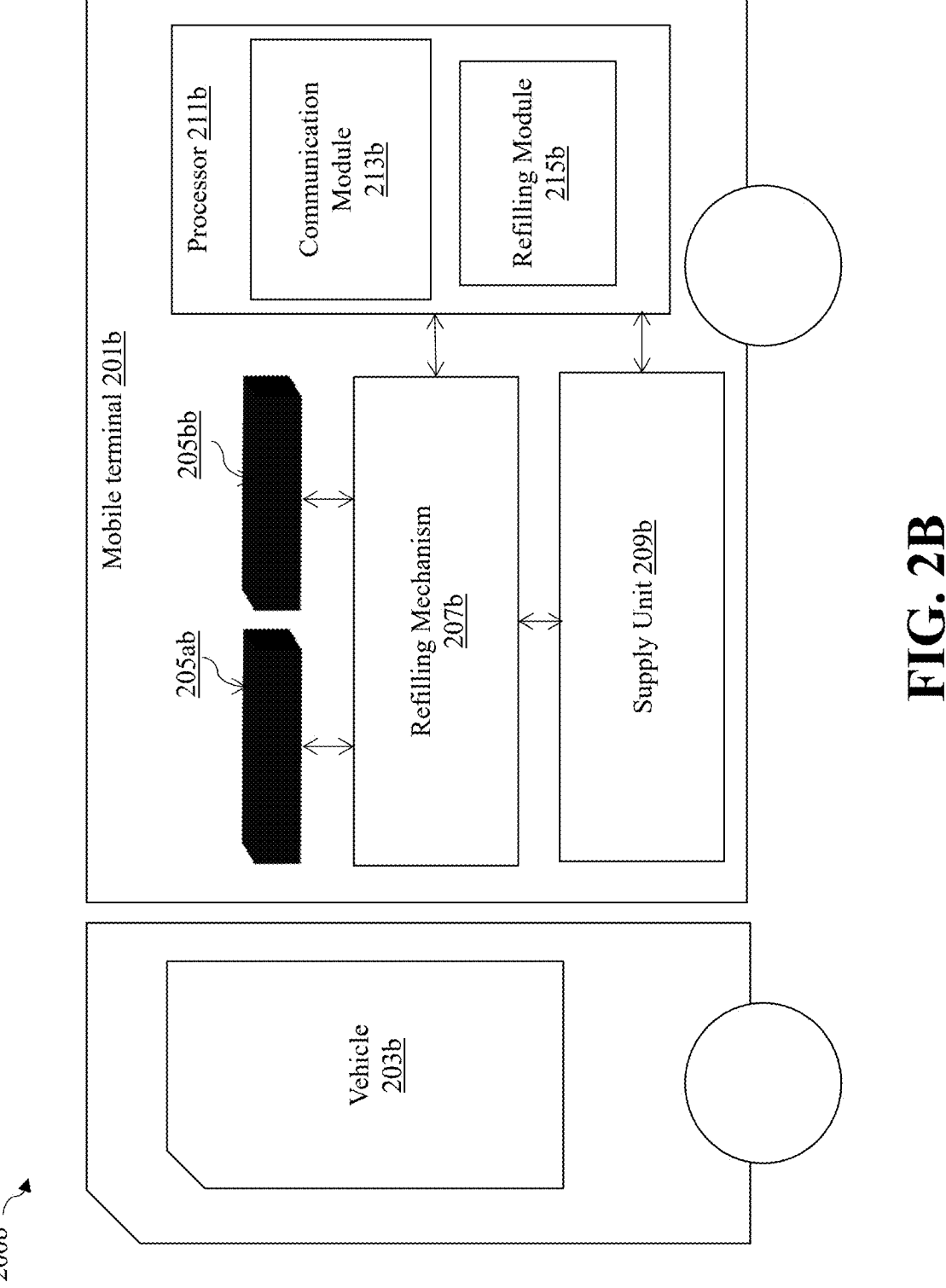

FIG. 2B illustrates a block diagram of an AGV including a mobile terminal, in accordance with an example embodiment.

Figure 3A:
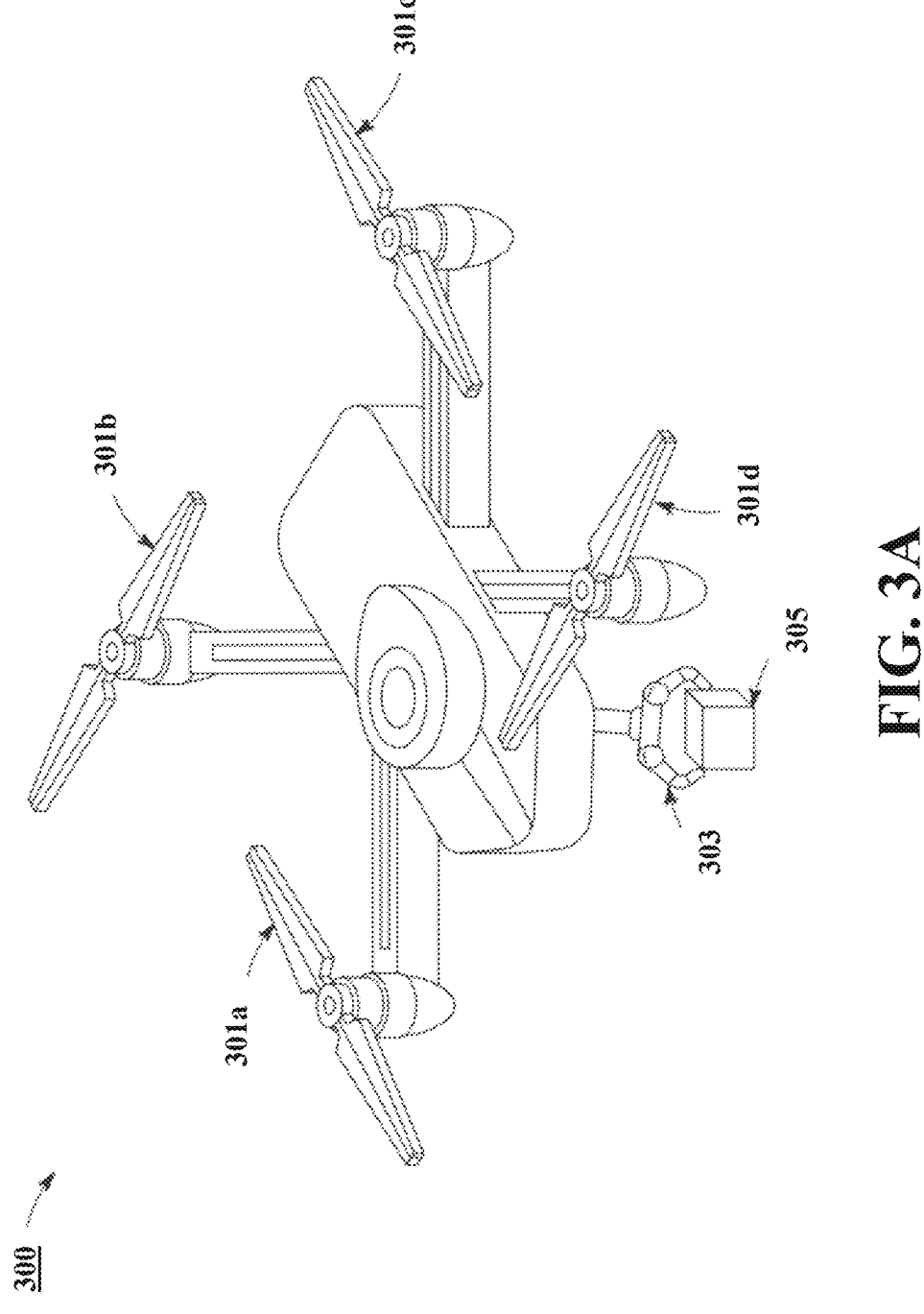

FIGS. 3A-3B show schematics of exemplar implementations of UAV and UAV used for performing different tasks, such as delivery services and monitoring tasks, in accordance with different embodiments.

FIG. 4 shows a pseudo-code of a joint motion control problem for controlling hybrid robots of different dynamics addressed by different embodiments.

Figure 5:
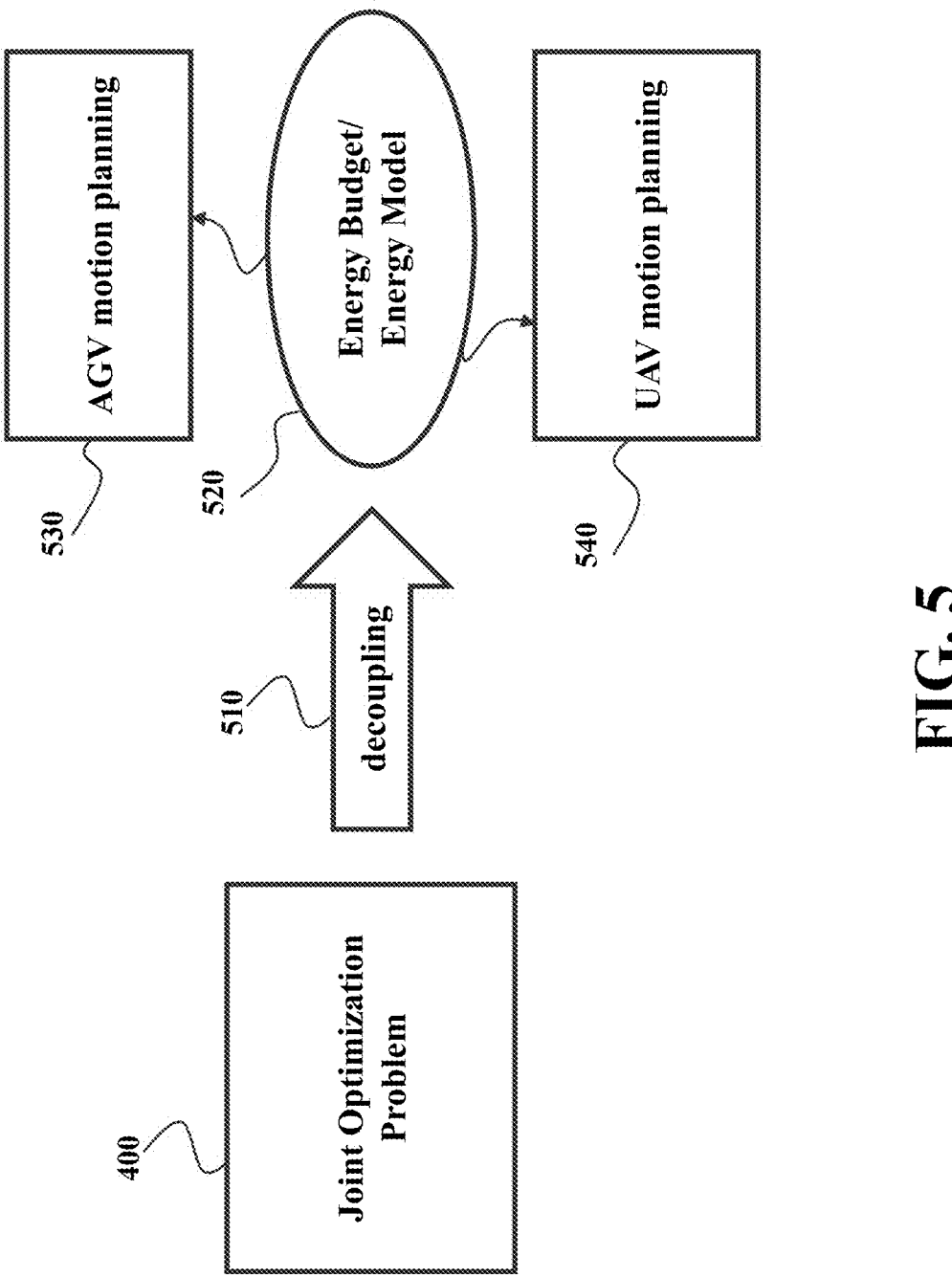

FIG. 5 shows a schematic of decoupling the joint motion planning problem into an AGV motion planning and UAV motion planning according to some embodiments.

Figure 6A:
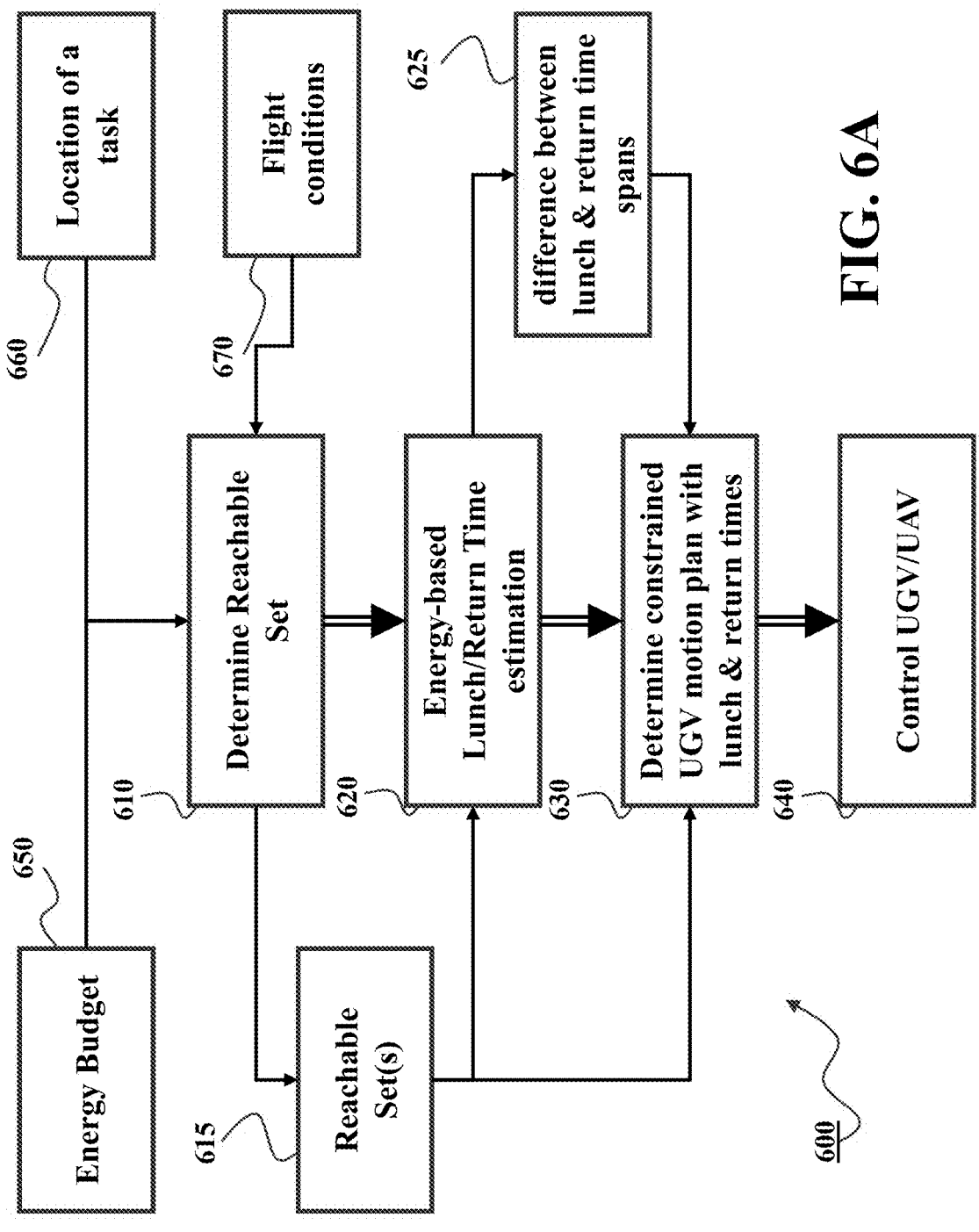

FIG. 6A shows a block diagram of method for controlling an autonomous ground vehicle (AGV) carrying one or multiple unmanned aerial vehicles (UAVs) to perform one or multiple tasks necessitating visiting one or multiple target locations according to some embodiments.

Figure 6B:
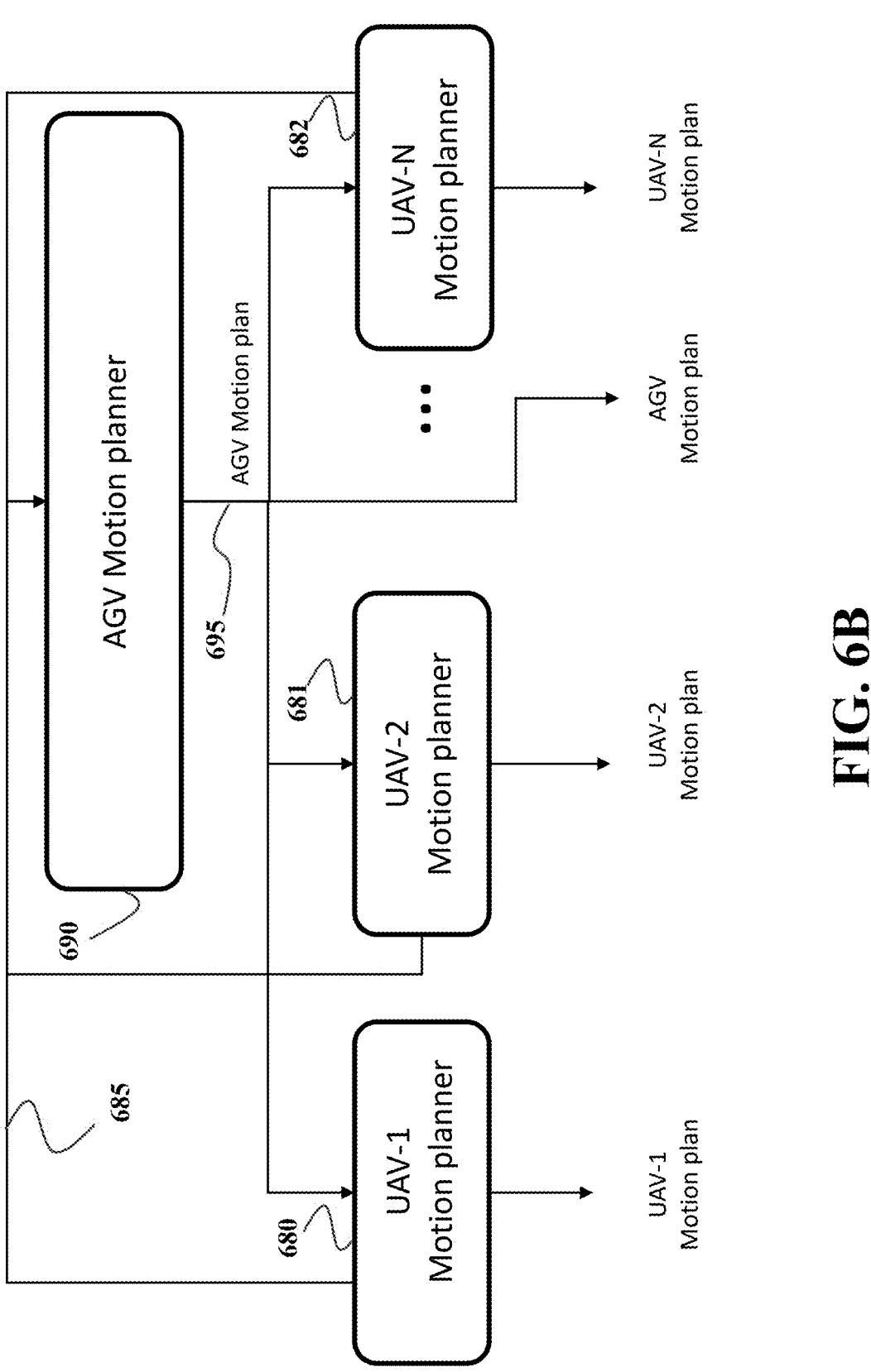

FIG. 6B shows a schematic of the architecture of a decoupled motion planning system where the motion planners of UAVs, provide the reachable regions to an AGV motion planner.

Figure 7A:
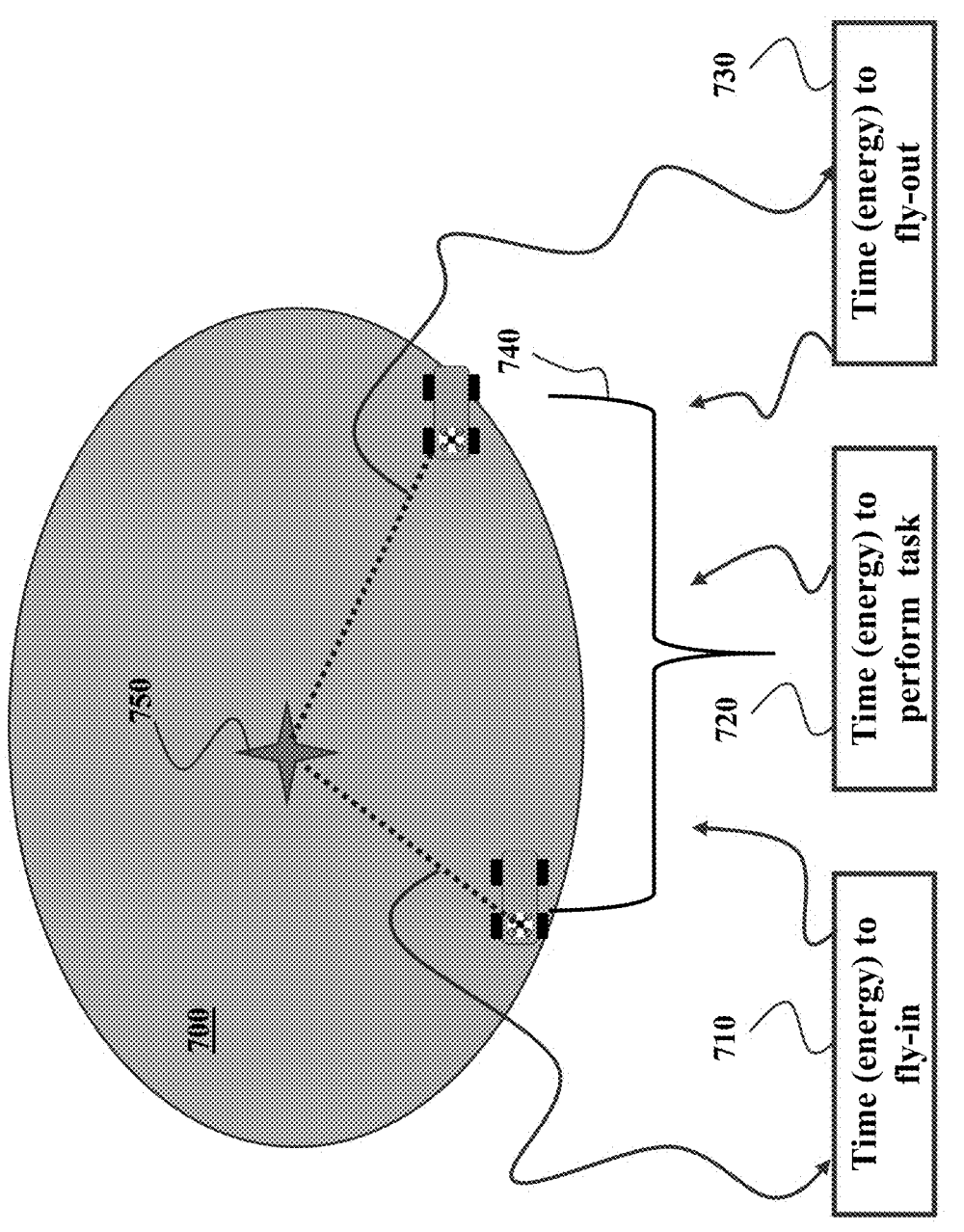

FIG. 7A shows a schematic illustrating the dependency between the energy budget, energy model, and the task to be performed, with the difference between launch and recovery time spans employed by some embodiments.

Figure 7B:
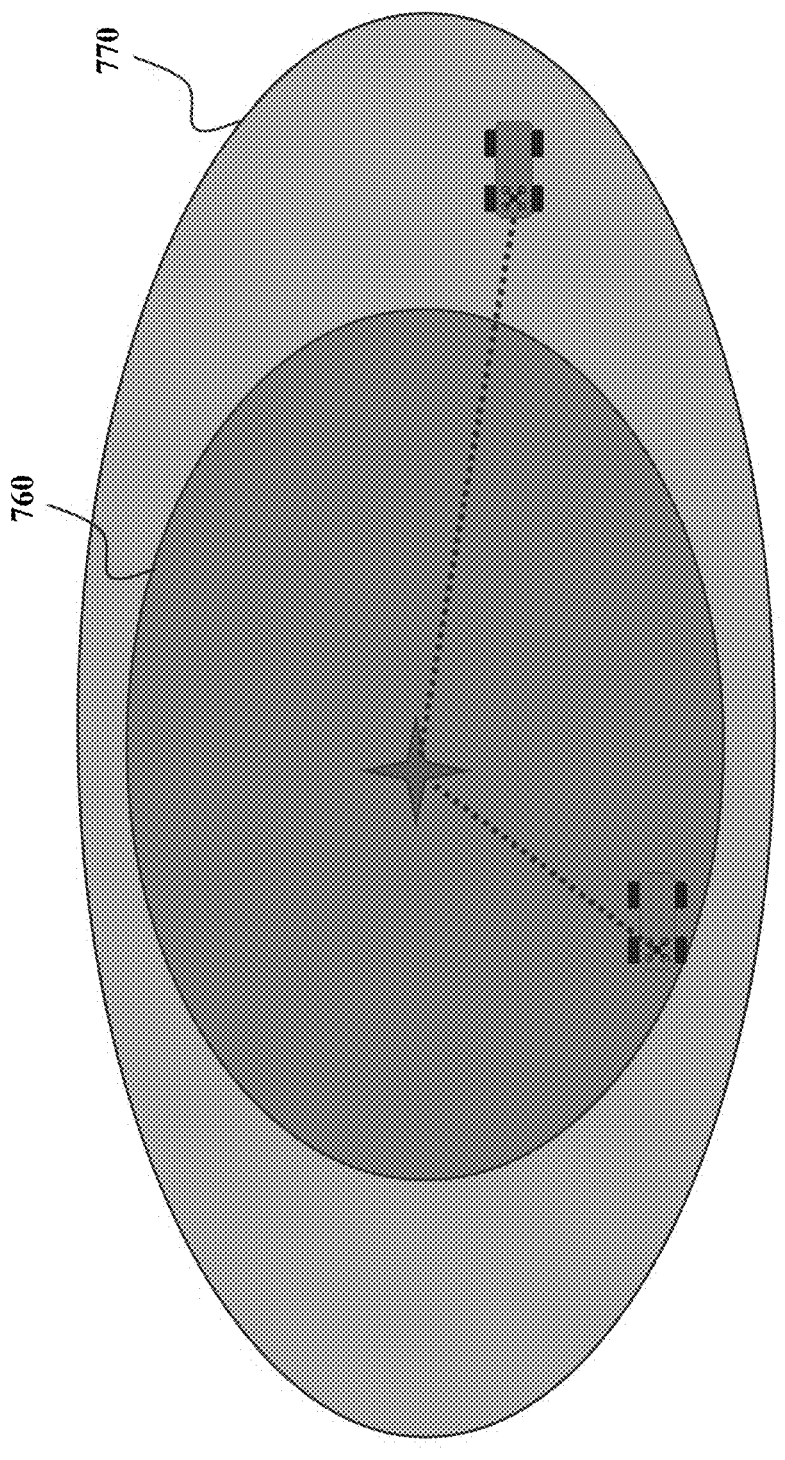

FIG. 7B shows a schematic of determining different reachable sets of launch and recovery operations according to some embodiments.

Figure 8:
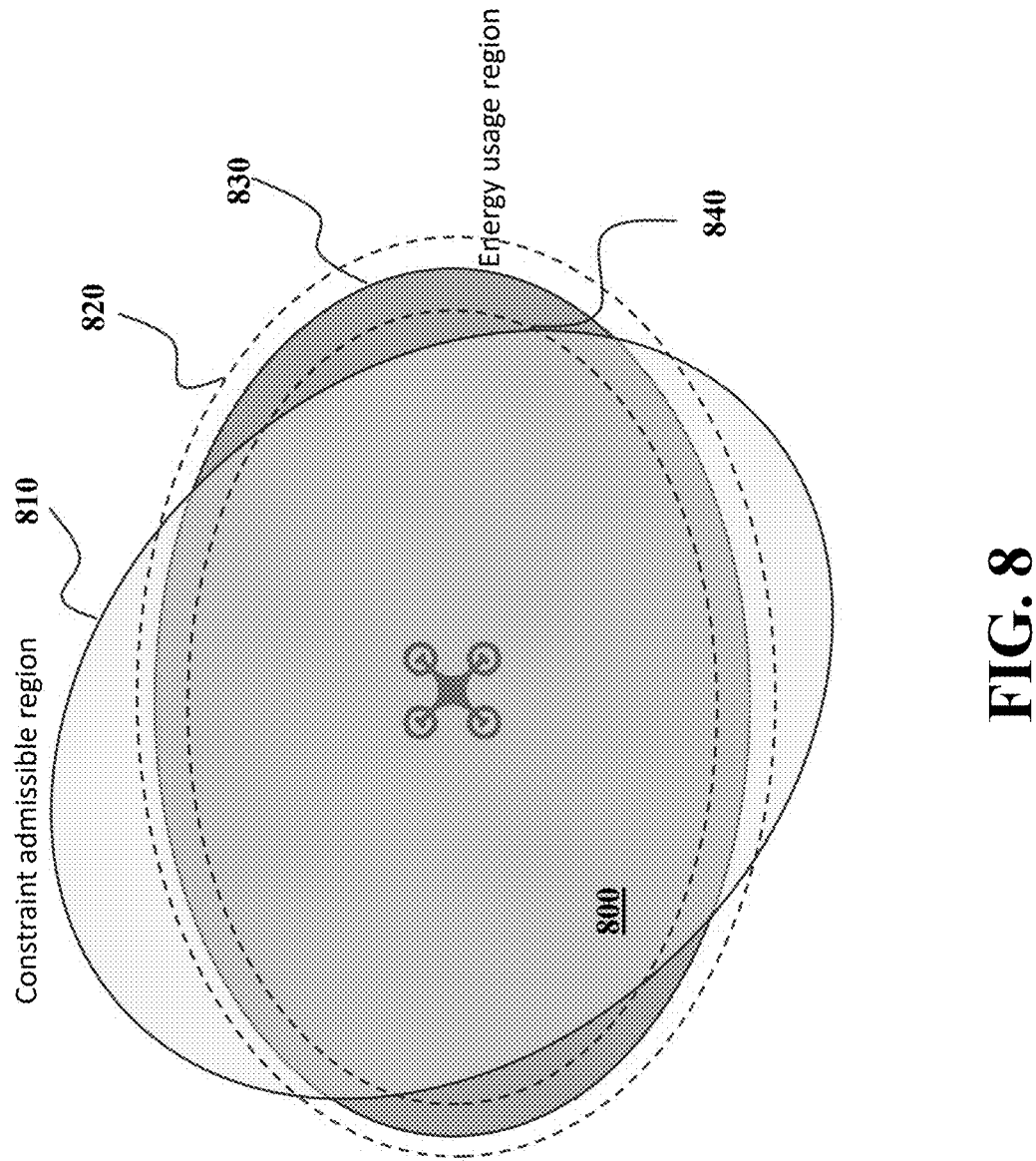

FIG. 8 shows a schematic illustrating a method for determining a reachable set as an intersection of a Lyapunov stability set defined by a first Lyapunov function and a Lyapunov energy set, or defined by a second Lyapunov function, according to some embodiments.

Figure 9:
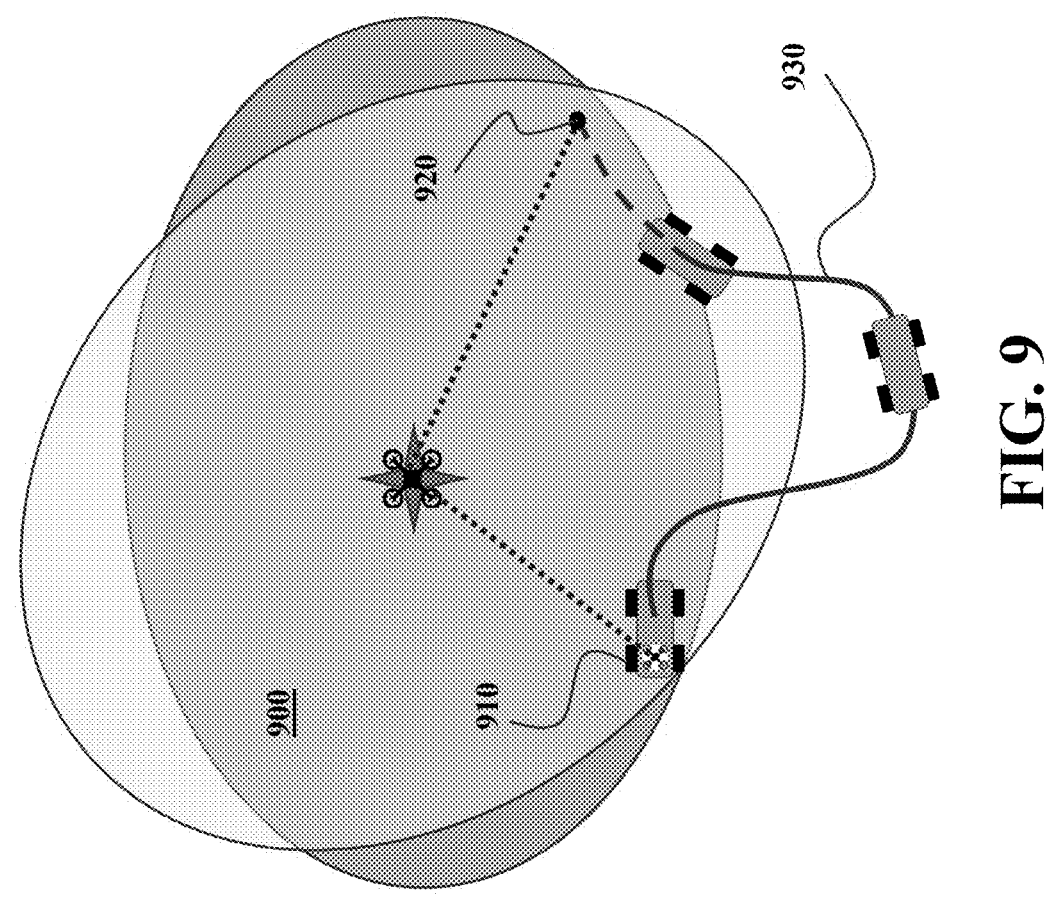

FIG. 9 shows a schematic illustrating the additional flexibility of energy-based reachable sets according to some embodiments.

Figure 10:
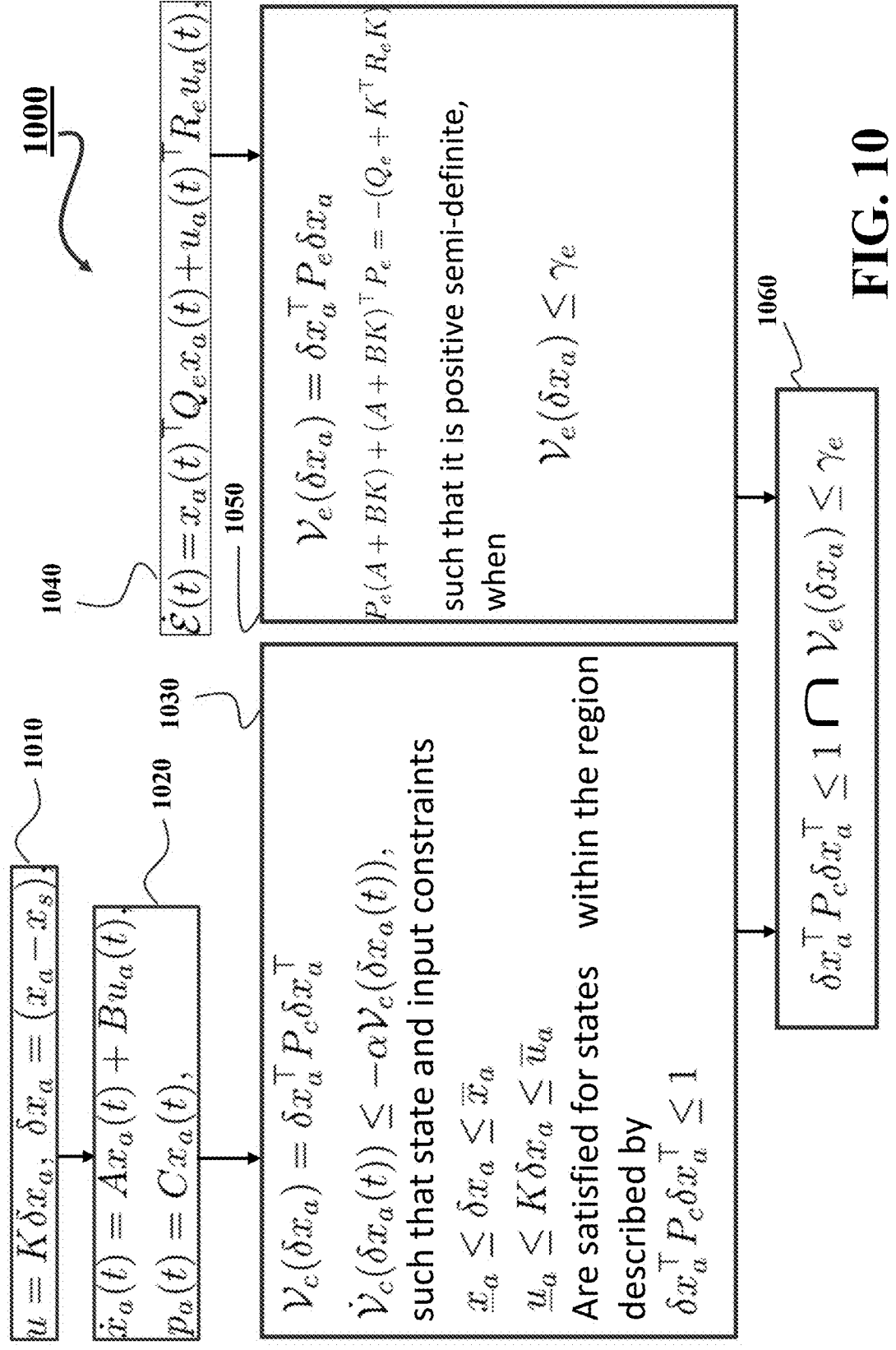

FIG. 10 shows a schematic of a method for determining a reachable set under the special assumption of a linear control method for the linear motion of the UAVs according to some embodiments.

Figure 11:
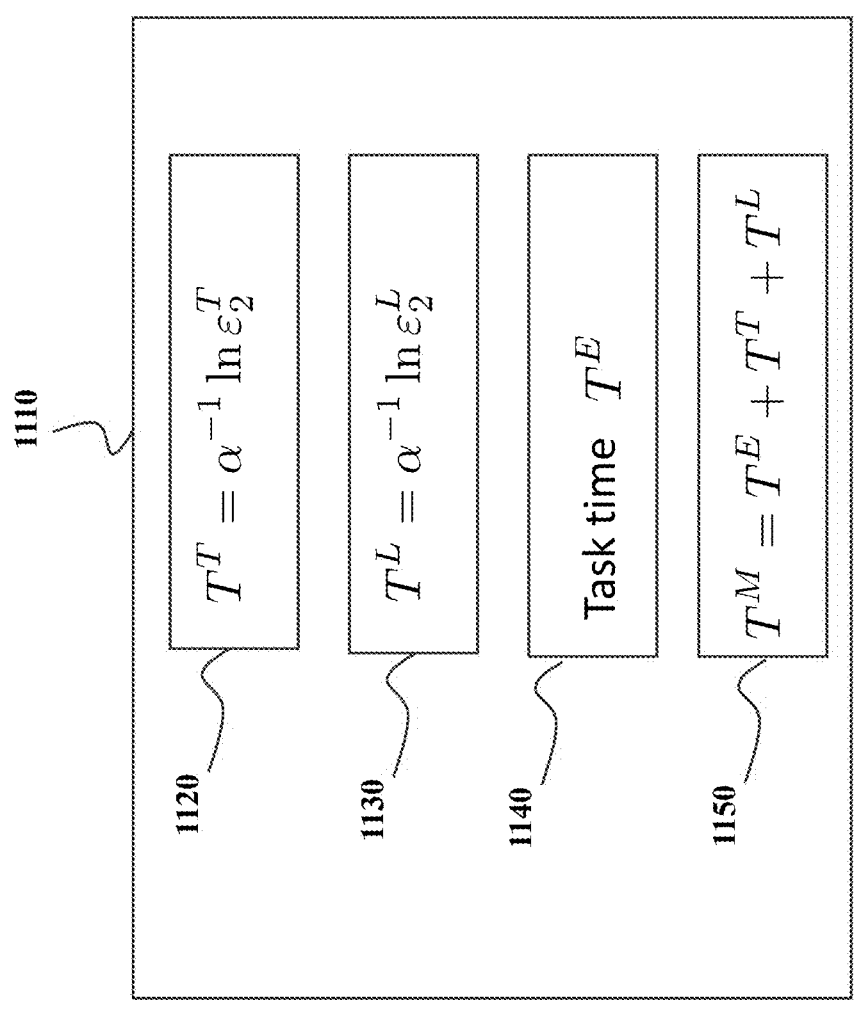

FIG. 11 shows a schematic of time calculation for launch and recovery operations according to some embodiments.

Figure 12A:
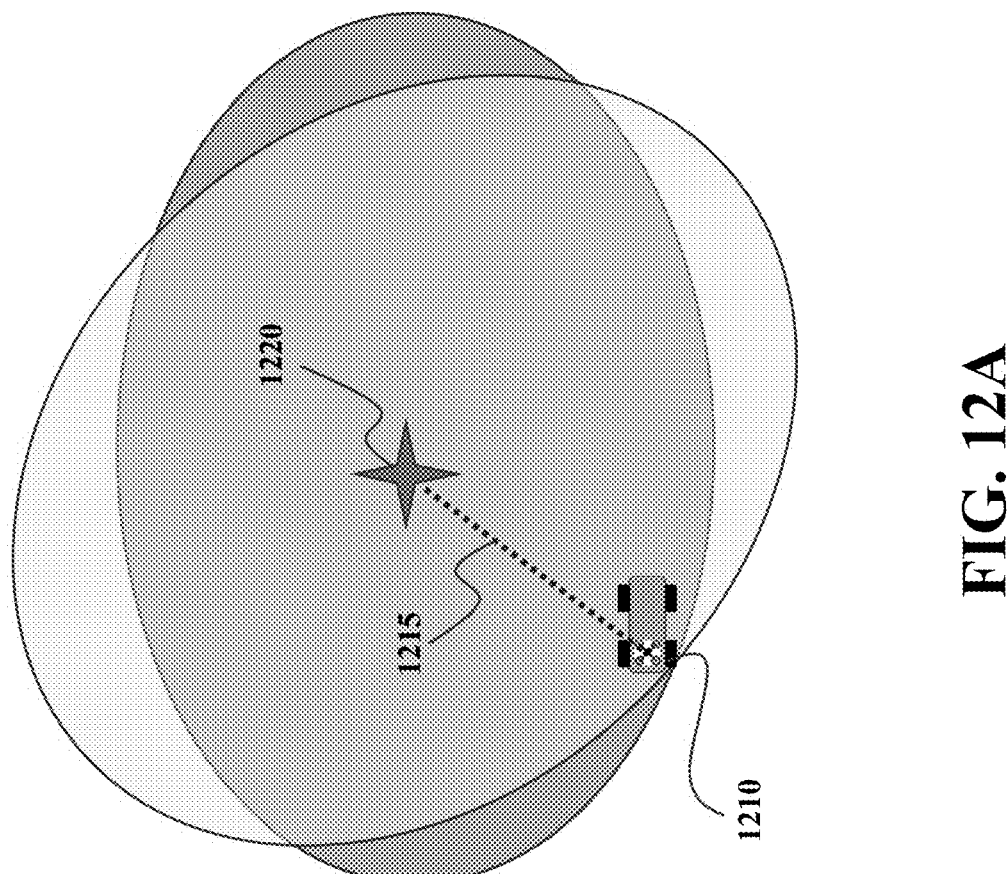
Figure 12B:
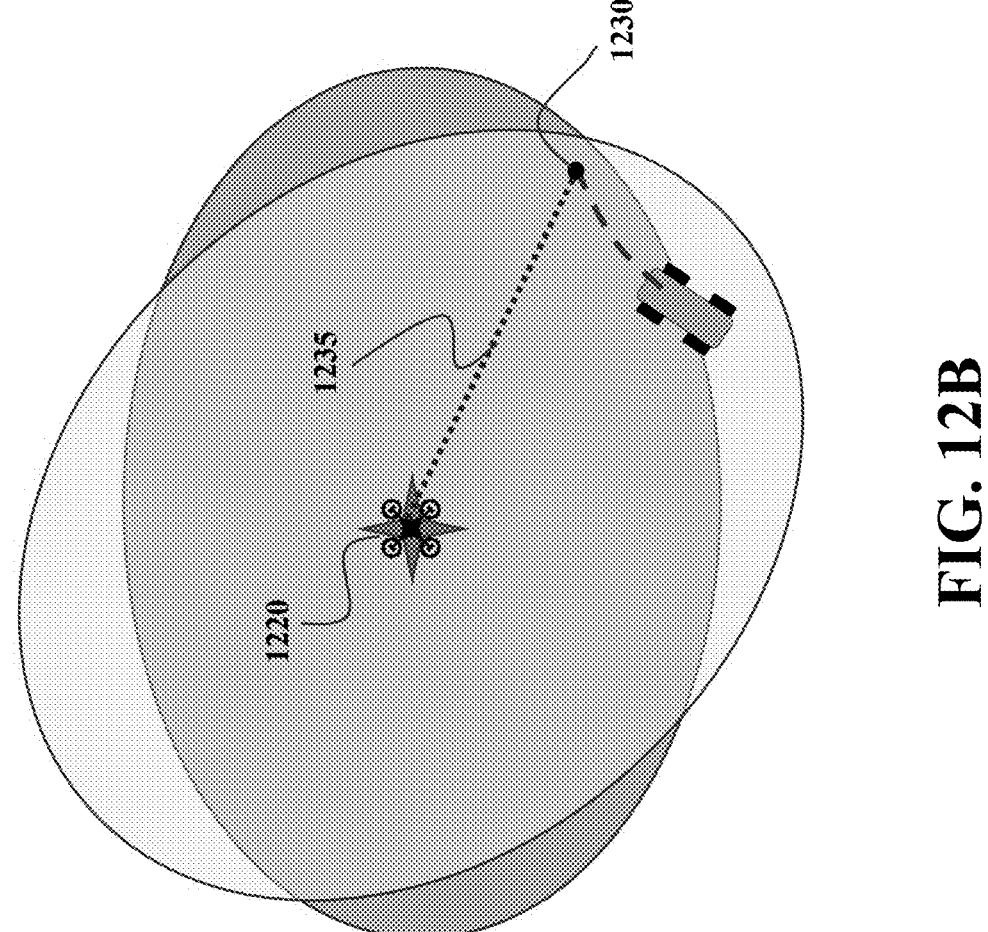

FIGS. 12A and 12B show schematics of computation of launch and return commands and trajectories based on reachable regions according to some embodiments.

Figure 13A:
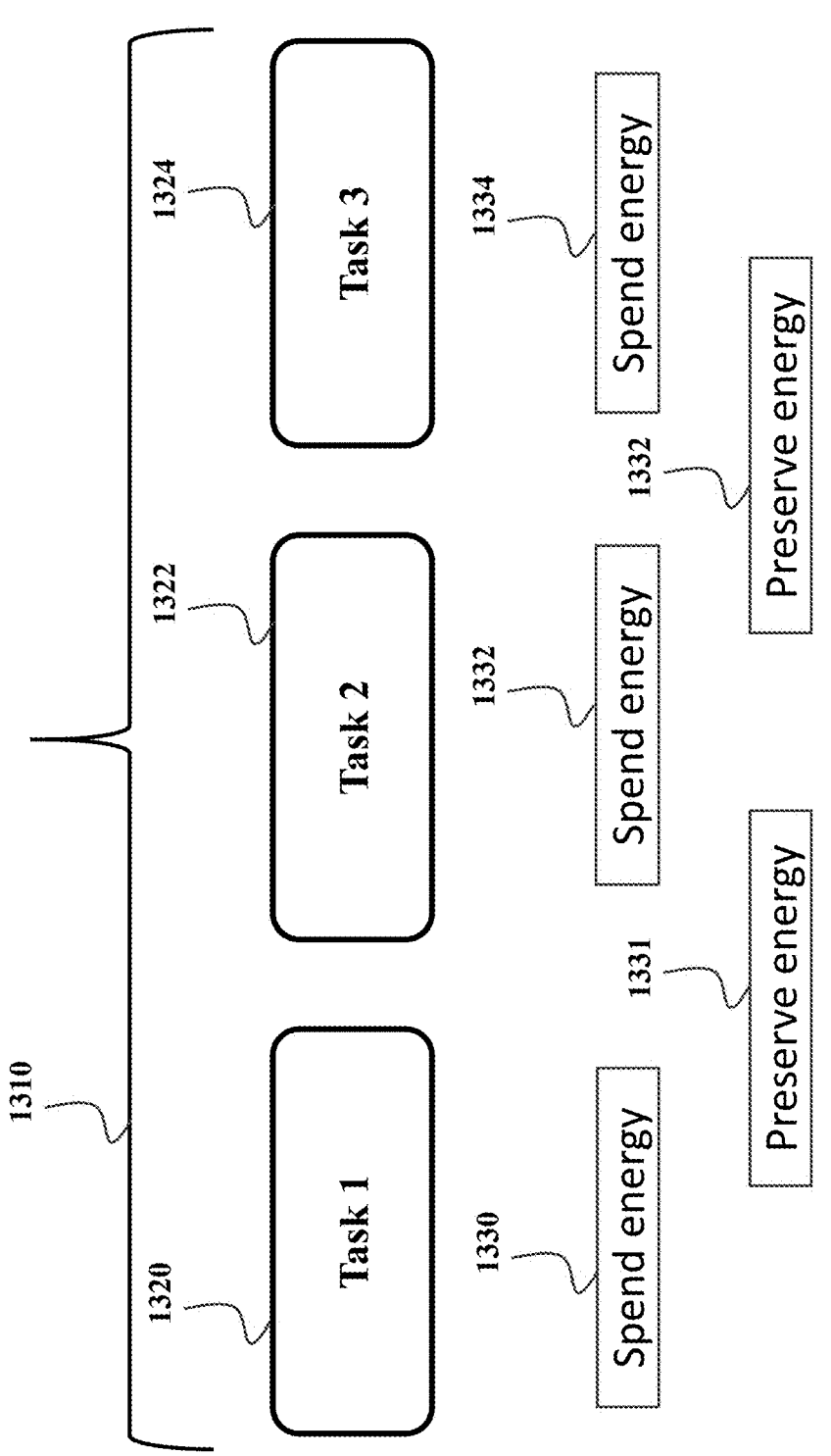
Figure 13B:
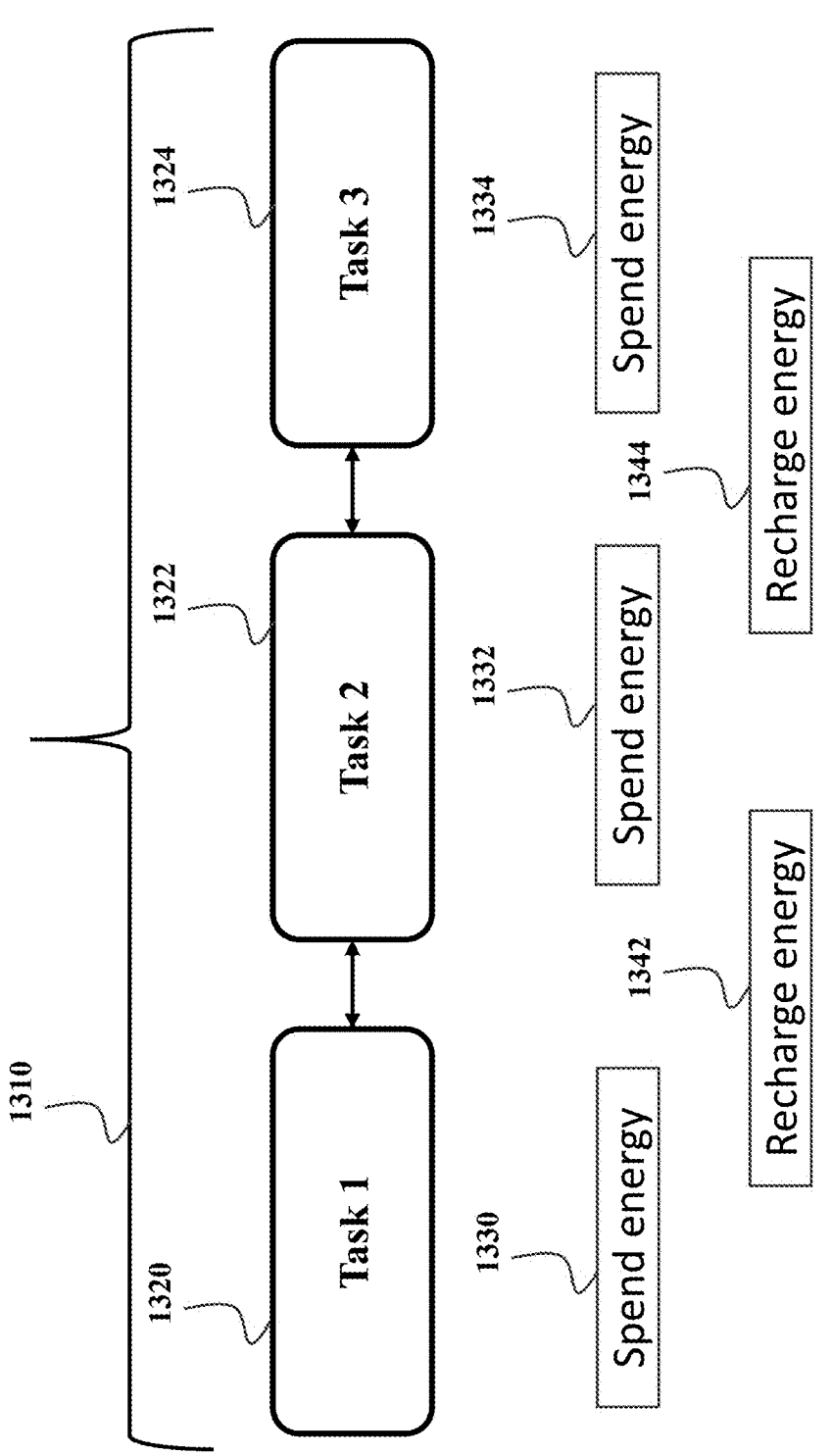

FIGS. 13A and 13B show schematics of allocating energy budget for performing different tasks by different UAVs according to different embodiments.

FIG. 13B shows a schematic of an embodiment allowing for recharging the UAV between the performance of the tasks.

Figure 13C:
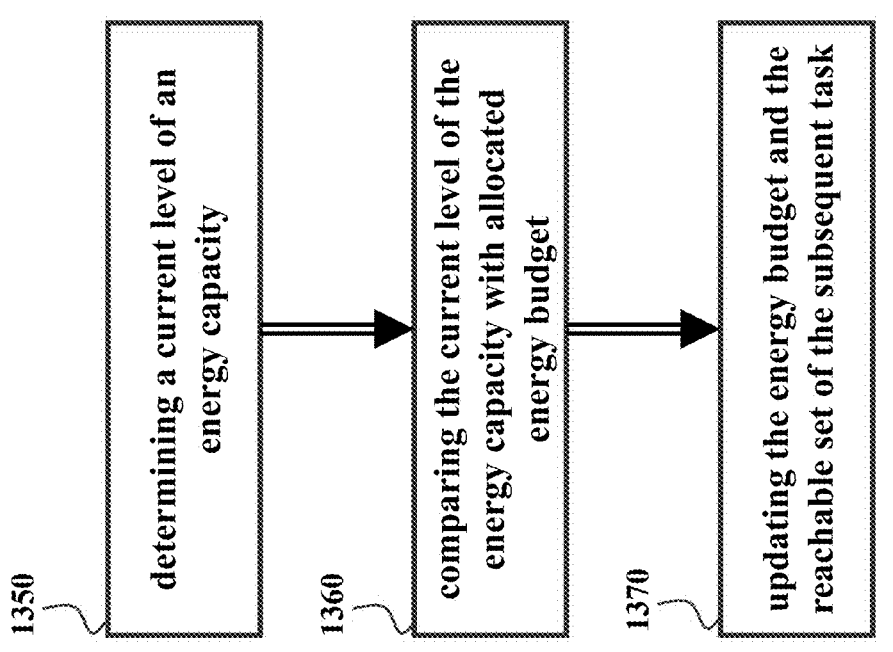

FIG. 13C shows a flow chart of a method for determining energy budgets dynamically based on the actual performance of the tasks according to some embodiments.

FIG. 14 shows a pseudo-code of an exemplar optimization method employed by some embodiment.

Figure 15:
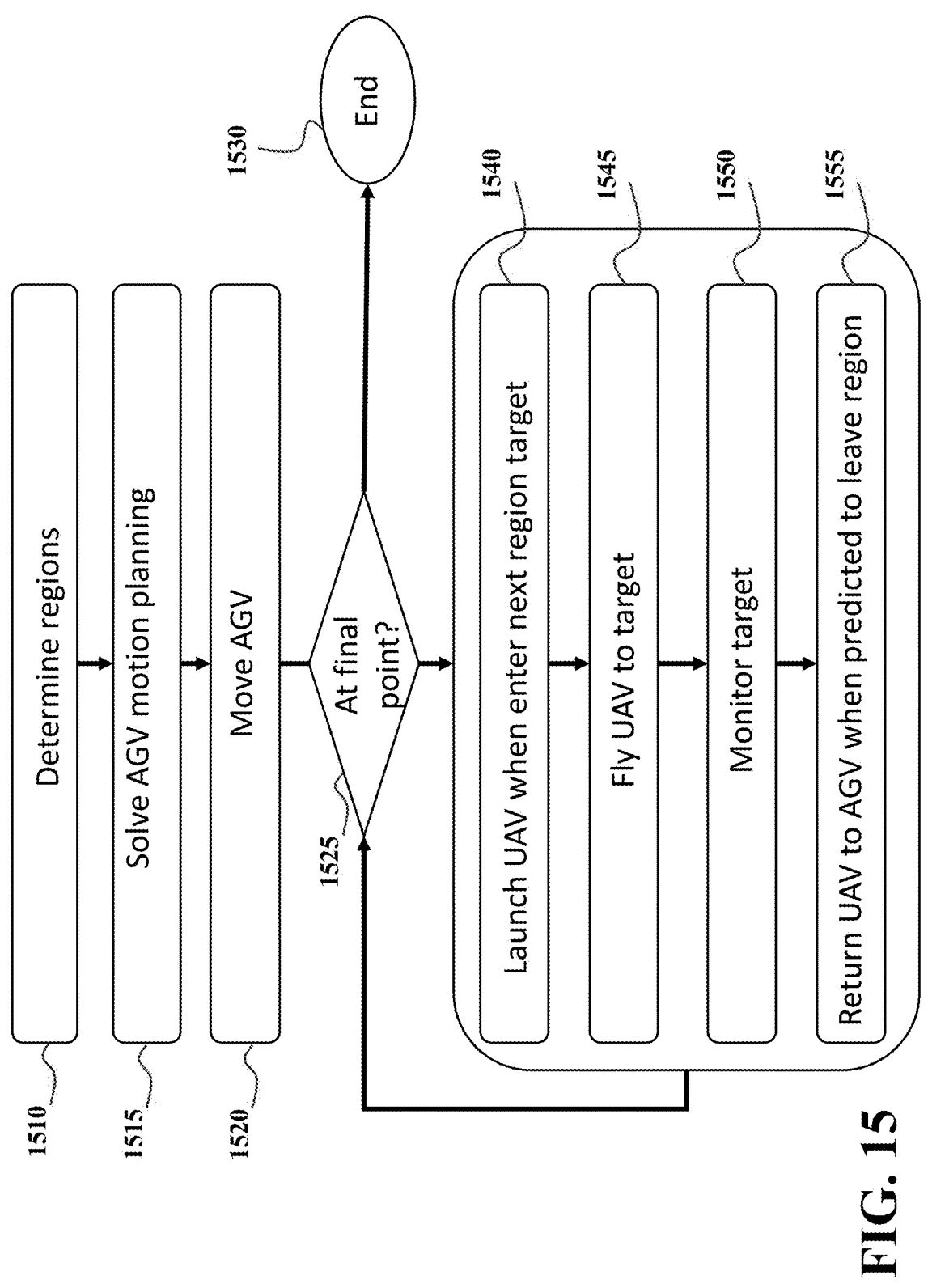

FIG. 15 shows a block diagram of a method for an iterative estimation of the AGV and UAV initial motion trajectories according to some embodiments.

Figure 16:
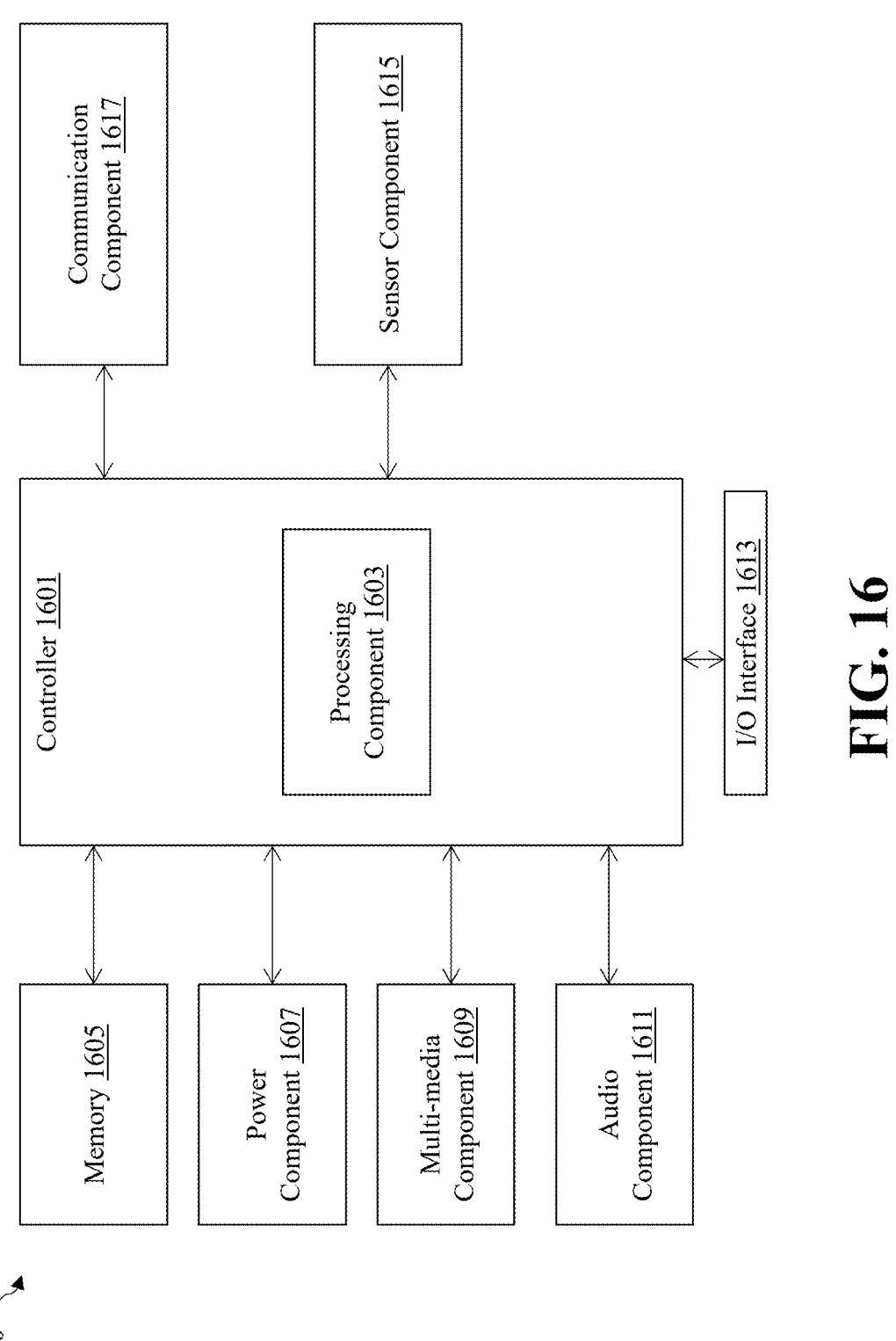

FIG. 16 illustrates a block diagram of a controller for the exemplar UAV according to an exemplary embodiment.

Figure 17:
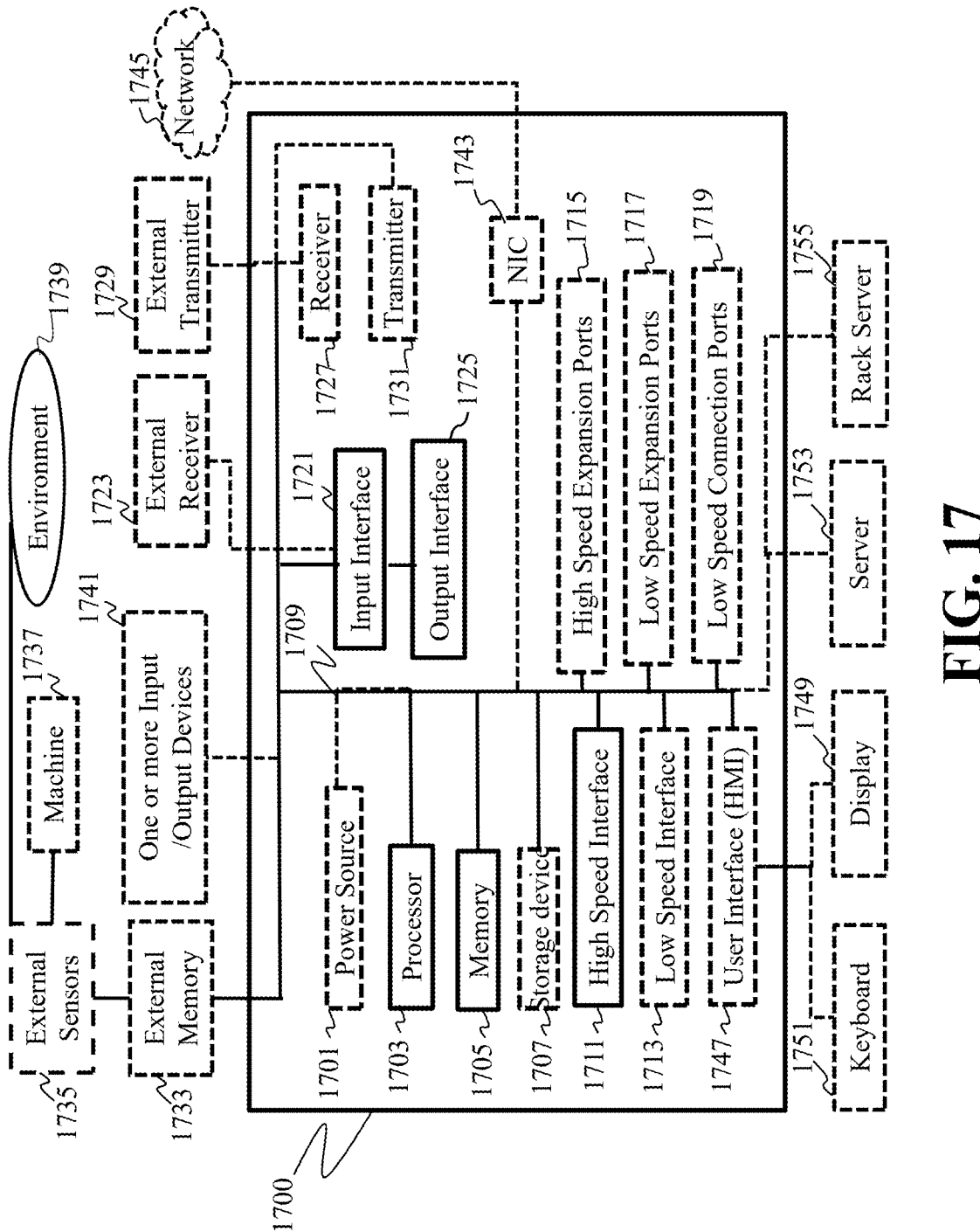

FIG. 17 illustrates a schematic of a computing device for implementing the system and joint planning methods of the present disclosure, in accordance with an example embodiment.

DETAILED DESCRIPTION

Problem Overview

It is an object of some embodiments to control an autonomous ground vehicle (AGV) carrying one or multiple unmanned aerial vehicles (UAVs) to perform one or multiple tasks necessitating visiting one or multiple target locations over an uncertain duration by one or multiple UAVs. AGVs can include different types of vehicles configured for autonomous driving and suitable for carrying the UAVs from one location to another. Examples of AGVs include various unmanned vehicles, such as robots and rovers, a ground vehicle, as well as autonomous vehicles capable of carrying passengers in addition to drones. Examples of UAVs include various aerial drones in various shapes and sizes, both fixed and rotating wings, and designed for different purposes, such as consumer drones,
professional drones, industrial drones, and agriculture drones.

FIG. 1 shows an exemplar schematic of controlling an AGV carrying one or multiple UAVs to perform one or multiple tasks necessitating visiting one or multiple target locations according to some embodiments. An AGV 110 is controlled according to a motion trajectory 115 defining different locations 112 and 114 of the AGV 110 at different instances of time. In this example, the motion trajectory 115 leads the vehicle 110 in proximity to the target locations, depicted as stars, such as stars 141 and 142, till the final location 120.

The motion trajectory 115 goes around non-traversable terrain and boundaries, such as mountains 130, 135, and river 137. When the AGV 110 is in proximity to the target locations, the AGV commands UAVs, e.g., UAV 125 and/or 126, to visit target locations to perform a task. The AGV can continue its motion while the AUV performs the task. For example, a UAV 126 can travel to a target location 143 from a vehicle at launch location 112 and return from the target location 143 over a trajectory 155 to the AGV at a recovery location 114, which is different from the launch location 112. In such a manner, the joint performance of AGV and UAV can be improved, but the motions of the AGV and UAV should be planned jointly.

FIG. 2A shows a schematic of a control system 201a implemented on the AGV 110 for controlling a fleet of Unmanned Aerial Vehicles (UAVs), in accordance with an example embodiment. As shown in FIG. 2A, the control system 201a is communicatively coupled to a fleet of UAVs 213al via a communication network 211a. The fleet of UAVs 213al includes a plurality of drones, i.e., a UAV 213a, a UAV 213b, a UAV 213c, and a UAV 213d. The fleet of UAVs 213al may be stationed at platform 213e arranged on the AGV 110. The system 201a includes a processor 203a and a memory 205a. The system 210a can also include or be connected to a database 207a, and a user interface 209a. Memory 205a includes stored instructions 205aa implementing the joined control method. The processor 203a is coupled with the stored instructions implementing the method, wherein the instructions, when executed by the processor carry out steps of the joined control method.

Various components of the control system 201a may be coupled directly or indirectly to the communication network 211a. The communication network 211a may be wired, wireless, or any combination of wired and wireless communication networks, such as cellular, Wi-Fi, internet, local area networks, or the like. In some embodiments, the communication network 211a may include one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks (for e.g. LTE-Advanced Pro), 5G New Radio networks, International Mobile Telecommunications (ITU-IMT) 2020 networks, code division multiple access (CDMA), wideband code division multiple access (WCDMA), wireless fidelity (Wi-Fi), wireless LAN (WLAN), Bluetooth, Internet Protocol (IP) data casting, satellite, mobile ad-hoc network (MANET), and the like, or any combination thereof. The components of the control system 201a may be further broken down into more than one component and/or combined together in any suitable arrangement. Further, one or more components may be rearranged, changed, added, and/or removed.

The system 201a includes suitable logic, circuitry, and interfaces that may be configured to control the one or more UAVs of the fleet of UAVs 213al to perform the one or more missions efficiently. In some embodiments, the fleet of UAVs 213al may be stationed at the initial terminal 213e. Further, at least one of the UAV 213a, the UAV 213b, the UAV 213c, and the UAV 213d may be used to perform the one or more missions efficiently. In some embodiments, the system 201a may be embodied as a chip or chip set. In other words, the system 201a may comprise one or more physical packages (such as chips) that includes materials, components and/or wires on a structural assembly (such as, a baseboard).

The memory 205a of the system 201a may include one or more modules related to, but not limited to, related to, but not limited to, geocoding, routing (multimodal, intermodal, and unimodal), clustering algorithms, machine learning in location-based solutions, natural language processing algorithms, and artificial intelligence algorithms. Data for one or more modules of the memory 205a may be collected using a plurality of technologies including, but not limited to drones, sensors, connected cars, cameras, interfaces, probes, and chipsets.

In some embodiments, memory 205a may be non-transitory and may include, for example, one or more volatile and/or non-volatile memories. In other words, for example, the memory 205a may be an electronic storage device (for example, a computer-readable storage medium) comprising gates configured to store data (for example, bits) that may be retrievable by a machine (for example, a computing device like the processor 203a). The Memory 205a may be configured to store information, data, content, applications, instructions, or the like, to enable the apparatus to carry out various functions in accordance with an example embodiment of the present invention. For example, the memory 205a may be configured to buffer input data for processing by the processor 203a. The memory 205a may be configured to store instructions for execution by the processor 203a. As such, whether configured by hardware or software methods, or by a combination thereof, the processor 203a may represent an entity (for example, physically embodied in circuitry) capable of performing operations according to an embodiment of the present invention while configured accordingly. Thus, for example, when processor 203a is embodied as an ASIC, FPGA, or the like, the processor 203a may be specifically configured hardware for conducting the operations described herein. Alternatively, as another example, when processor 203a is embodied as an executor of software instructions, the instructions may specifically configure processor 203a to perform the algorithms and/or operations described herein when the instructions are executed. However, in some cases, the processor 203a may be a processor-specific device (for example, a mobile terminal or a fixed computing device) configured to employ an embodiment of the present invention by further configuration of the processor 203a by instructions for performing the algorithms and/or operations described herein. The Processor 203a may include, among other things, a clock, an arithmetic logic unit (ALU), and logic gates configured to support the operation of the processor 203a.

In some embodiments, system 201a includes processor 203a for conducting processing functions associated with system 201a and database 207a for storing and retrieving data. In an embodiment, system 201a may comprise one or more processors configured to process requests received from system 201a. Further, in some embodiments, the database 207a comprises suitable logic, circuitry, and interfaces that may be configured to store the data associated with one or more participants of one or more missions.

In some implementations, the AGV 110 can be implemented as a mobile terminal configured to carry and charge the UAV 213al. Due to the length of the mission and limited charge available to UAVs, some UAVs may be unfeasible to perform the specific mission. However, the AGV 110 can be implemented as a mobile terminal and can transform an unfeasible UAV, i.e., unfeasible for a task, into a feasible UAV capable of carrying the mission.

FIG. 2B illustrates a block diagram 200b of an AGV including a mobile terminal 201b, in accordance with an example embodiment. As shown in FIG. 2B, the mobile terminal 201b includes a landing pad 205ab, a landing pad 205bb, a refilling mechanism 207b, a supply unit 209b, a processor 211b, a communication module 213b, and a refilling module 215b. The mobile terminal 201b is mounted on a vehicle platform 203b such as a truck that may be operated by a driver or autonomously by a ground vehicle controller. The vehicle platform 203b may include one or more sensors. The sensors include, but are not limited to, geolocation sensors, light sensors, proximity sensors, image sensors, and the like. In some embodiments, the processor 211b is further configured to determine a reduced amount of fuel for each UAV of the fleet of UAVs 213al based on the joint motion optimization.

Further, based on the determined reduced amount of fuel, the processor 211b is further configured to transform a non-feasible UAV of the fleet of UAVs into a feasible UAV to perform the mission. Further, in some embodiments, the processor 211b is further configured to transform the UAV 27 by changing the location of the mobile terminal 201b. In one embodiment, the processor is configured to recover the UAV on the landing pad 205ab of the mobile terminal 201b. In one embodiment, the processor 211b is configured to transform the non-feasible UAV into a feasible UAV by refilling fuel using the refilling mechanism 207b. Further, the refilling mechanism 207b is associated with the refilling module 215b and the supply unit 209b.

The refilling mechanism 207b is integrated into the mobile terminal 201b and is coupled with each landing pad of the mobile terminal 201b via the communication module 213b. The refiling mechanism 207b is configured to perform the refiling of resources for one or more missions associated with one or more UAVs. The resources may include, but are not limited to: fuel, energy, consumables, fluids, and materials. The refilling mechanism 207b may include resource containers, flow control valves, resource compatibility sensors, a pumping mechanism, a recharging mechanism, a pressure monitoring system, flow rates sensors, safety interlocks, a leak detection system, and a refiling control panel.

Further, the supply unit 209b is connected with the refilling mechanism 207b via the refilling module 215b. The refilling module 215b is configured to receive a resource request from the refilling mechanism 207b. Further, based on the resource request, the supply unit 209b is configured to provide the resources to the refilling mechanism 207b. Additionally, the supply unit 209b is further configured to store, distribute, control, and monitor the resources for one or more missions.

Referring back to FIG. 2A, in some embodiments, the one or more UAVs of the fleet of UAVs 213al include one or more sensors, user equipment, and/or a communication interface (not shown in FIG. 2A). Additional, fewer, or different components may be provided. For example, a proxy server, a name server, a map server, a cache server or cache network, a router, a switch or intelligent switch, an additional database, additional computers or workstations, administrative components, such as an administrative workstation, a gateway device, a backbone, ports, network connections, and network interfaces may be provided. While the components in FIG. 2A are shown as separate from one another, one or more of these components may be combined. In this regard, system 201a may be communicatively coupled to the components shown in FIG. 2A to carry out the desired operations and wherever required modifications may be possible within the scope of the present disclosure.

Referring back to FIG. 2A, in some embodiments, the control system 211a is located in the vehicle 110, such that the link 211b is a local communication. In other embodiments the control system 211a is located remotely with respect to the vehicle 110, such that the link 211b is a communication network as 211a.

FIGS. 3A-3B show schematics of exemplar implementations of UAV 300 and UAV 310 used for performing different tasks, such as delivery services and monitoring tasks, in accordance with different embodiments. The UAV 300 corresponds to one of UAVs of the fleet of UAVs 213al, e.g., the UAV 213a. As shown in FIG. 3A, the UAV 300 comprises a rotor blade 301a, a rotor blade 301b, a rotor blade 301c, a rotor blade 301d, and a mechanical claw 303 for carrying a package 305.

As shown in FIG. 3B, in various implementations the UAV is equipped with sensors for performing monitoring tasks. For example, the UAV 310 maybe equipped with localization and flying sensors, monitoring sensors 320, 325, and/or guidance system 330.

Referring back to FIG. 3A, in some embodiments, the UAV 300 may be a single-rotor UAV that comprises a single rotor blade. In some embodiments, the UAV 300 may be a Tri copter that comprises three rotor blades. In some embodiments, the UAV 300 is a quadcopter that comprises four rotor blades. In some embodiments, the UAV 300 is a hex copter that comprises six rotor blades. In some embodiments, the UAV 300 is an octocopter that comprises eight rotor blades. In some embodiments, the UAV 300 having more than one rotor blade may be referred to as multi-rotor UAV. Further, in some embodiments, the UAV 300 is a fixed-wing UAV that comprises a fixed wing. In some embodiments, the UAV 300 is a fixed-wing hybrid vertical take-off landing (VTOL) UAV that is a hybrid of the fixed-wing UAV and VTOL aircrafts. In some embodiments, the one or more rotors may be referred to as "one or more propellers".

Further, the UAV 300 may include one or more means for carrying the package 305. One or more means include, but are not limited to, a vacuum mechanism, magnetic mechanism, electro-magnetic mechanism, or suction cup fastening mechanism.

In some embodiments, the UAV 300 may comprise a rotor assembly (not shown) to generate lift and thrust. The rotor assembly includes, but is not limited to a rotor hub, a rotor blade, a drive system, a fuselage, and a payload module. In some embodiments, the rotor hub is mounted on the central axis of the fuselage, allowing for rotation around the central axis of the fuselage. The rotor blade is attached to the rotor hub. Further, the rotor blade is rotated to generate the lift and thrust. The drive system is integrated into a power source to impart rotational motion to the rotor blade, enabling the flight operation of the exemplary UAV 300.

In some embodiments, the fuselage is a rigid structure that comprises one or more components for enabling the flight operation of the UAV 300. One or more components include, but are not limited to, the power source, and a flight control system. The power source is used to provide power to the rotor assembly. In one embodiment, the power source is an electric motor. Further, in some embodiments, the power source is a combustion engine. In some embodiments, the flight control system is used to maintain the stability of the UAV 300. In some embodiments, the flight control system is used for controlling one or more flight parameters. Further, in some embodiments, the flight control system is used to receive and process input commands. The payload module enables the attachment and transportation of one or more payloads. In one embodiment, the payload module is positioned beneath the rotor assembly. In one embodiment, the payload module is centrally located within the fuselage. In one embodiment, the payload module is integrated into a separate compartment. The payload module includes, but is not limited to cameras, sensors, and delivery mechanisms.

In some embodiments, a variable-pitch mechanism is incorporated in the UAV 300. The variable pitch mechanism allows for dynamic adjustment of the rotor blade's angle during flight. The variable-pitch mechanism enables precise control over the lift and thrust generation. The variable-pitch mechanism provides maneuverability, stability, and responsiveness in bad weather conditions such as snowstorm, heavy rainfall and the like. In some embodiments, the variable-pitch mechanism is used to perform complex flight maneuvers.

In some embodiments, a gyroscopic stabilization mechanism is incorporated in the UAV 300. The gyroscopic stabilization mechanism provides stability and counteracts a torque generated by rotation of the rotor blade. The gyroscopic stabilization mechanism comprises one or more sensors. The one or more sensors are used to detect and measure an angular movement of the UAV 300. Based on the measured angular mechanism, the flight control system adjusts a rotation speed of rotor blade and a blade pitch of rotor blade for maintaining balance during the flight.

In some embodiments, a swashplate mechanism is integrated into the UAV 300. The swashplate mechanism allows for cyclic control the pitch of rotor blade at one or more points along a length of rotor blade. By adjusting the pitch of the blade pitch cyclically, the UAV 300 achieves movement in one or more directions such as forward, backward, sideways, rotation, and the like.

In some embodiments, one or more avionics systems are incorporated in the UAV 300 for controlling and monitoring the flight. The one or more avionics systems comprise one or more sensors, one or more onboard processors, and a communication module. The one or more avionics systems collect data from the one or more sensors such as GPS, altimeters, gyroscopes, accelerometers, and magnetometers, multispectral sensors, thermal sensors to determine an exemplary UAV position, an exemplary UAV altitude, an exemplary UAV orientation and the like. The one or more avionics systems process the collected data to adjust the one or more control surfaces.

In some embodiments, a communication module facilitates communication between the UAV 300 and a ground control station (GCS). The communication module enables a real-time data transmission, a telemetry monitoring, a control signal exchange, and the like between the UAV 300 and a drone operator. In some embodiments, the communication module employs one or more wireless technologies such as a radio frequency (RF), a satellite communication, one or more cellular networks, and the like to communicate with the GCS.

In some embodiments, the assignment determined by the system 201*a* for the UAV of the fleet of UAVs 213*al* for the mission is transmitted to a controller associated with the UAV. The controller of the UAV is configured to determine a trajectory for the mission based on the received assignment. Further, the controller determines control commands that cause the UAV to track the trajectory. Alternatively, in some embodiments, the system 201*a* determines the control commands to track the trajectory. The system 201*a* further transmits determined control commands to the controller. The controller controls the UAV according to the control commands to track the trajectory for the mission.

As a result, an AGV 110 and a UAV 300 may be controlled independently and/or jointly. The joint control can optimize the overall performance but needs to consider differences in the dynamics of the robots of different types. Planning the motion of a robot that is slow and subject to natural barriers but with long/almost unlimited range (such as AGV) deploying and recovering task-performing robots that are fast and not subject to natural barriers (such as UAV), but with limited range over long mission is potentially challenging. Due to the different dynamics of AGVs and UAVs, fast sampling is needed (since the UAV motion is fast) over a longer horizon (since the overall AGV mission is long). Also, motion planning contains continuous decisions (the motion) and discrete decisions (when to release and when to recover). Also, many trajectories need to be optimized together, and the computational burden usually grows at least polynomially with the number of decision variables. Also, while the range consumption during transfer flight can be easily computed, the range consumption while the mission is being carried out at the target may be hard to compute (e.g., in target monitoring missions, sensing and processing power computation are hard to predict).

Instead, the AGV motion requires only slow sampling, and the UAVs missions are short. If one can decouple the planning of UAVs and AGV motions the problem can be greatly simplified and the multiple problem solved will be faster than solving a single large optimization problem, due to the polynomial increase of the computation with the decision variables. However, the motion plans of AGVs and UAVs needs to be coordinated because the AGVs needs to deploy and appropriately recover the UAVs, without the UAVs running out of range. So the motion plan of the AGVs needs to be such that recovery of the UAVs within the limits of range from UAV mission target is possible, and similarly the deployment of the UAV is possible, to reach target with sufficient range left to carry out the mission and rendezvous with AGV.

FIG. 4 shows a pseudo-code of a joint motion control problem for controlling hybrid robots of different dynamics addressed by different embodiments. The joint motion planning problem provides motion trajectoris for an AGV and multiple UAVs to monitor a sequence of targets. The plans of AGV and UAVs are correlated because the UAVs depart from and rendezvous with the AGV for long-distance transport, re-charging, and possibly data dumping. Thus, while the AGV does not need to visit the targets itself, it needs to follow a plan that allows for the recovery of UAVs within the battery range and in a suitable time interval.

For clarity, the disclosure includes the following notation: $\mathbb{R}$, $\mathbb{R}_{0+}$, $\mathbb{R}_+$, $\mathbb{Z}$, $\mathbb{Z}_{0+}$, $\mathbb{Z}_+$ are the sets of real, nonnegative real, positive real, integer, nonnegative integer, positive integer numbers. Intervals are denoted by $\mathbb{Z}_{[a,b)} = \{z \in \mathbb{Z}: a \le z < b\}$, I is the identity matrix, 0 an "all-zeros" matrix of appropriate dimensions, and $Q \succ 0$, $(Q \succeq 0)$, a positive (semi) definite matrix. For vectors x, y the stacking is $(x, y) = [x]^T y^T]^T$, the 2-norm is $\|\cdot\|$.

For example, some embodiments consider the motion planning of one AGV, with state vector $x_g \in \mathbb{R}^{n_g}$, and $N_a$ UAVs, with state vectors $$x_a^{(i)} \in \mathbb{R}^{n_a}, i \in \mathbb{Z}_{[1,N_a]}.$$

The AGV motion model is $$\dot{x}_g(t) = f_g(x_g(t), u_g(t)) \tag{1}$$

$$p_g(t) = h_g(x_g(t)), \tag{2}$$

where $u_g \in \mathbb{R}^{m_g}$ is the input vector and $p_g \in \mathbb{R}^2$ is the position vector in global coordinates. The choices for the AGV motion model include linear double integrators, unicycle, and bicycle. The AGV is subject to constraints $$x_g \in \mathcal{X}_g, u_g \in \mathcal{U}_g, \tag{3}$$

where $\mathcal{X}_g \subseteq \mathbb{R}^{n_g}$, $\mathcal{U}_g \in \mathbb{R}^{m_g}$, are sets defining the admissible state and input vectors, respectively.

Some embodiments consider quadrotor UAVs with linear motion model $$\dot{x}_a^{(i)}(t) = A x_a^{(i)}(t) + B u_a^{(i)}(t), \tag{4}$$

$$p_a^{(i)}(t) = C x_a^{(i)}(t), \tag{5}$$

where $$u_a^{(i)} \in \mathbb{R}^{m_a}$$

is the input vector and $$p_a^{(i)} \in \mathbb{R}^2$$

is the UAV position vector in global coordinates, for all $i \in \mathbb{Z}_{[1,N_a]}$. For instance, (2) may be two double integrators, $n_a = 4$, $m_a = 2$, $$A = \begin{bmatrix} 0 & I \\ 0 & 0 \end{bmatrix}, B = \begin{bmatrix} 0 \\ I \end{bmatrix}, C = \begin{bmatrix} I & 0 \end{bmatrix}$$

and $x_a^{(i)} = \left[ p_{a,x}^{(i)}, p_{a,y}^{(i)}, v_{a,x}^{(i)}, v_{a,y}^{(i)} \right]^\top$, $u_a^{(i)} = \left[ a_{a,x}^{(i)}, a_{a,y}^{(i)} \right]^\top$.

For shortness, $$p_a^{(i)} = \left( p_{a,x}^{(i)}, p_{a,y}^{(i)} \right), v_a^{(i)} = \left( v_{a,x}^{(i)}, v_{a,y}^{(i)} \right), \text{ and } a_a^{(i)} = \left( a_{a,x}^{(i)}, a_{a,y}^{(i)} \right)$$

denote the positon, velocity and acceleration vectors, respectively. The UAVs are subject to constraints on velocity and acceleration $$\left\| v_a^{(i)} \right\| \le v_{max}, \|a_a\|^{(i)} \le a_{max},$$

for all $i \in \mathbb{Z}_{[1,N_a]}$ that can be written as $$x_a^{(i)} \in \mathcal{X}_a, u_a^{(i)} \in \mathcal{U}_a, \tag{6}$$

where $\mathcal{X}_a \subseteq \mathbb{R}^{n_a}$, $\mathcal{U}_g \subseteq \mathbb{R}^{m_a}$ are the sets of admissible UAVs state and input vectors, respectively. The embodiments of the invention consider the UAVs to be faster than the AGV.

For simplicity, the disclosed embodiments model the motion of the UAVs in two dimensions, i.e., with a constant flight altitude, but all out developments translate immediately to the 3D case, where a third integrator is added for the altitude dynamics.

The range of the AGV is assumed to be significantly larger than what needed for the task to be executed, while the UAVs are battery powered and have limited range. For energy consumption during flight, the spent battery energy changes according to $$\dot{\mathcal{E}}(t) = c_2 \left( v_a^{(i)}(t) \right)^2 + c_1 \left( a_a^{(i)}(t) \right)^2,$$

where the embodiments of the invention model the dominant effects of air drag, proportional to the square of the velocity, and losses in accelerating, both mechanical and electrical, modeled as proportional to the squared acceleration. Thus, $$\dot{\mathcal{E}}^{(i)}(t) = x_a^{(i)}(t)^\top Q_e x_a^{(i)}(t) + u_a^{(i)}(t)^\top R_e u_a^{(i)}(t), \tag{7}$$

$\varepsilon^{(i)}(t)^{(i)} \le \varepsilon_{max}$ for $i \in \mathbb{Z}_{[1,N_a]}$, where $\varepsilon_{max}$ is the maximum usable energy. During task execution, the main source of energy consumption is from actuators performing tasks, and sensors, from processing acquired information, and possibly from communicating data to the AGV acting as base station. A prediction model for such consumption is hard to develop, and hence the embodiments of the invention do not rely on it, as it will become clear later.

The exemplar model (1) ignores the idling and stationary flight energy consumption, to focus on the mission phases when the UAVs are moving. These may be included as constants or ignored if embodiments allow the UAV to land and stop the propellers.

While the UAV has limited range, it is unaffected by ground obstacles, which impose constraints on the AGV. The exclusion constraints on the AGV are $$p_g \notin \mathcal{O}^{(o)}, o \in \mathbb{Z}_{[1,N_o]}, \tag{8}$$

where $N_o$ is the number of obstacles, and $\mathcal{O}^{(o)}$ is the collision region for obstacle o, i.e., the set of AGV positions $p_g$ for which a collision may occur, accounting for the physical shapes of both obstacle and AGV.

The objective of the AGV and UAVs is to acquire information about a set of targets, $j \in \mathbb{Z}_{[1,N_m]}$ located a known positions $$p_m^{(j)} = \left( p_{m,x}^{(j)}, p_{m,y}^{(j)} \right).$$

For that the AGV is to release the UAV carrying the actuators, sensors and communication for performing a task such as monitoring to fly at the monitoring location, acquire data with sensors, process them and send the raw and/or processed data back to the AGV for storage or long distance transmission, the embodiments of the invention assume that the sequence in which targets are to be visited is assigned, and are clustered in groups with know maximum number of elements per cluster.

Given initial time instant $T_0$, $N_m$ task location targets with positions $$p_m^{(j)} = \left( p_{m,x}^{(j)}, p_{m,y}^{(j)} \right), j \in \mathbb{Z}_{[1,N_m]},$$

$N_O$ obstacle collision sets $\mathcal{O}^{(o)} \subseteq \mathbb{R}^2$, $o \in \mathbb{Z}_{[1,N_O]}$, a AGV with motion model (2) subject to (3), (8), initial state $x_g(T_0) = x_{g,s}$ and desired final state $x_{g,f}$, and $N_a$ UAVs with motion model (2), energy depletion model (7), subject to (6) and initial states $$x_{a,s}^{(i)} = x_{g,s}$$

for $i \in \mathbb{Z}_{[1,N_a]}$, determine a terminal time instant $T_f > T_0$
time instants $$t_{ij}^l, t_{i,j}^b, t_{i,j}^e, t_{i,j}^r, j \in \mathbb{Z}_{[1,N_m]}, i \in \mathbb{Z}_{[1,N_a]},$$

commands $u_g(t)$ for $$t \in [T_0, T_f], u_a^{(i)}(t)$$

for $$t \in \bigcup_{j=1}^{N_a} \left[ t_{i,j}^l, t_{i,j}^b \right] \cup \left[ t_{i,j}^e, t_{i,j}^r \right], i \in \mathbb{Z}_{[1,N_a]},$$

such that:
(Timing)

$$t_{i,j}^l \leq t_{i,j}^b \leq t_{i,j}^e \leq t_{i,j}^r$$

for all $$i, j, t_{i,j+1}^l > t_{i,j}^r$$

tor all $j \in$ $$\mathbb{Z}_{[1,N_m-1]}, i \in \mathbb{Z}_{[1,N_a]}, t_{i,1}^l \geq T_0, t_{i,N_m}^r \leq T_f,$$

for all $i \in \mathbb{Z}_{[1,N_a]}$ (UAV traj.)

$$x_a\left( t_{i,j}^l \right) = x_g\left( t_{i,j}^l \right), \mathcal{E}\left( t_{i,j}^l \right) = 0, x_a\left( t_{i,j}^r \right) = x_g\left( t_{i,j}^r \right), \mathcal{E}\left( t_{i,j}^r \right) \leq \mathcal{E}_{max},$$

for all $j \in \mathbb{Z}_{[1,N_m]}$, $i \in \mathbb{Z}_{[1,N_a]}$, and (6) is satisfied.
(task execution) for all $j \in \mathbb{Z}_{[1,N_m]}$, there exists $i \in \mathbb{Z}_{[1,N_a]}$
and $$t_{i,j}^m$$

such that $$p_a^{(i)}(t) = p_m^{(j)},$$

for all $$t \in \left[ t_{i,j}^b, t_{i,j}^e \right].$$

(AGV trajectory) $x_g(T_f) = x_{g,f}$ and (3), (8) are satisfied
The time instants $$t_{i,j}^l, t_{i,j}^b, t_{i,j}^e, t_{i,j}^r$$

are the launch, beginning of the task execution, end of the task execution and recovery time of UAV i to target j, respectively. For notational simplicity the embodiments of the invention determine such time instants for of all UAVs to each target, but the embodiments of the invention only require one UAV to actually reach the target for task execution, that means that the launch, task execution (beginning and ending), and release time for all the others may be set equal, and hence ignored. the embodiments of the invention determine UAV commands only between launch and beginning of task execution, and between end of task execution and recovery. Between recovery and the next launch the UAVs will be docked with the AGV, and during task execution the UAVs are considered stationary though practically they will use a separate motion strategy to optimize data acquisition.

In practice, to solve the motion planning problem as a whole may be challenging due to the different time-scales of AGV and UAVs motions, the hybrid nature of the decision variables, i.e., continuous control signals and discrete events such as launch and recovery, and the possibly large number of variables when many UAVs are considered. In what follows the embodiments of the invention develop a method to decouple the motion planning problem for AGV and UAVs while ensuring recovery can be achieved within the UAV safe flight envelope and range.

To that end, it is an object of some embodiments to address the decentralized planning of the AGV and UAV's motion to ensure that all missions can be accomplished and rendezvous with AGV is feasible within the UAV's limits of range.

Solution Overview

FIG. 5 shows a schematic of decoupling 510 the joint motion planning problem 400 into an AGV motion planning 530 and UAV motion planning 540 according to some embodiments. To decouple the control of AGV and UAV while allowing both the AGV and UAVs to jointly perform a task, some embodiments use the connection 520 of the state space of the dynamical system and energy of the dynamical system embodied in but not limited to principles of levels of Lyapunov functions.

Some embodiments are based on the realization that because the AGV and UAV share the state space, the control of the AGV performed in the common state space can be used to constrain the energy depletion of the UAV through the levels of the Lyapunov function of UAV's dynamics. This realization allows decoupling the control of the AGV and UAV to perform a task jointly by using the motion of the AGV as an energy constraint on the operation of the UAV. Such a connection makes the operation of the UAV dependent on the motion of the AGV in a flexible manner that allows independent optimization of the motion of the UAV from optimization of the motion of the AGV.

Specifically, the level of a Lyapunov function refers to its value at a particular point in the state space of a dynamical system. In the context of stability analysis, a Lyapunov function is a scalar function that can be used to analyze the stability of an equilibrium point of a dynamical system.

For example, if embodiments have a dynamical system described by the differential equation. $\dot{x}=f(x)$, where x is the state vector and $f(x)$ describes the system dynamics, and if $x^*$ is an equilibrium point of the system (i.e., $f(x^*)=0$), then a Lyapunov function is a function $V(x)$ such that:

1. $V(x^*) = 0$ (the function is zero at the equilibrium point).

$V(x)>0$ for all $x \neq x^*$ in some neighborhood of $x^*$ (the function is positive definite).

$\dot{V}(x)<0$ for all x in that neighborhood (the derivative of the function along trajectories of the system is negative/semi-definite).

As used herein, the "level" of the Lyapunov function at a point x refers to the value of $V(x)$ at that point. The level can indicate how far the system state is from the equilibrium point and whether the system is moving towards or away from the equilibrium based on the sign of $\dot{V}(x)$. If $\dot{V}(x)<0$, the system is moving towards the equilibrium, and if $\dot{V}(x) >0$, the system is moving away from the equilibrium.

Some embodiments are based on the recognition that the Lyapunov function can be solved to estimate its level sets. In the context of Lyapunov functions, a "level set" refers to a set of points in the state space of a dynamical system where the Lyapunov function takes a particular value. In other words, for a Lyapunov function $V(x)$, the level set of V at a constant value c is the set of all points x in the state space such that $V(x)=c$.

When an equilibrium point of the Lyapunov function of dynamics of a UAV is aligned with a target location of a task, level set c defines the energy needed for the UAV to cover a distance between the target location and state space corresponding to level set c. Because the AGV and UAV share the state space, if the state space corresponding to level set c intersects the motion trajectory of the AGV, it is guaranteed that the UAV can reach the AGV at the point of intersection by spending the amount of energy defined by level c. Accordingly, to guarantee that the UAV has sufficient energy for traversing between the AGV and the target location, there is a need to find the level set of the Lyapunov function of dynamics of a UAV defining a segment of space intersecting the AGV trajectory when an equilibrium point of the Lyapunov function is aligned with a target location of a task. Doing this in such a manner allows controlling the motion of the AGV according to the AGV trajectory while instructing the UAV to perform the task according to its own computations subject to one or a combination of energy constraints governed by the level set of Lyapunov function and time constraints governed by a time instance of the segment of space intersecting the AGV trajectory.

Such an understanding allows to use energy budget specified for the performance of each task and the energy model of the motion of the UAV to perform the motion planning 540 of the UAV subject to the energy budget and energy model of the UAV 520, and after that to use the planned UAV motion as a constraint to plan the motion of the AGV 530.

For example, some embodiments are based on realizing that the connection between AGV and UAVs motion is the recovery and launch operations. For these, the main limitation is the range of the UAVs. Hence, the motion plan of AGVs and UAVs can be decoupled by determining the regions that the UAVs can reach based on their remaining range. The regions can be formulated as constraints, and include also other limitations, such as the UAV's speed and acceleration. Then, to ensure safe recovery, the range-dependent constraints can be included in a motion planning problem for the UAVs alone, imposing crossing for at least a time window of a certain length. The problem returns an AGV trajectory and a return range threshold for UAVs such that, if the UAV returns to the AGV before the range (range is energy) is below the threshold in a way that reaches the AGV trajectory in the appropriate window, then rendezvous will safely occur with the available range. Thus, the UAVs can now safely plan their return motion. When the range reaches the lower threshold or when the timing is such that the UAVs reach the AGV at the end of the time window, the UAVs start moving towards AGV. Then, rendezvous will occur. A similar approach can be used for launching decisions, where the range regions are now centered on the target, and the AGV motion is imposed to enter the regions from which the UAVs can reach the target within a range. Once AGV trajectory is decided, re-optimization of UAV trajectory one-by-one is possible which may further reduce range consumption, thus enabling longer time spent executing the mission at the target.

FIG. 6A shows a block diagram of method 600 for controlling an autonomous ground vehicle (AGV) carrying one or multiple unmanned aerial vehicles (UAVs) to perform one or multiple tasks necessitating visiting one or multiple target locations according to some embodiments. The method uses a processor coupled with stored instructions implementing the method, wherein the instructions, when executed by the processor carry out steps of the method. In some embodiments, method 600 is performed by a control system 201a of FIG. 2A.

Method 600 collects energy budgets 650 for each of the one or multiple tasks at target locations 660 to be performed by each of the one or multiple UAVs and determines 610, for each of the tasks based on an energy budget 650 collected for a task and an energy model of a UAV assigned to the task, a reachable set 515 defining a region of space including a target location 660 for performing the task that enables the UAV located in the reachable set to reach the target location, spent predetermined energy for performing the task and exit the reachable set while staying within the energy budget and operating within a safe envelope of flight conditions 670.

In various embodiments, the reachable sets are determined based on the energy model of the UAV 520. However, in addition to using the energy model to determine the reachable sets, the embodiments are based on recognizing that the energy model can also be used to estimate launch and recovery time spans within the reachable set allowing a UAV to reach the target location, perform a task spending energy predetermined for the type of the task, and reach a border of the reachable set for being recovered, i.e., picked up, by the AGV.

Hence, the embodiments of method 600 determine 620, based on the energy model of the UAV, a difference 625 between a launch time span and a recovery time span of the UAV based on the dimensions of the reachable set and time allocated for the performance of the task corresponding to the energy predetermined for the task. For example, some implementations determine a range of launch time and a range of recovery time with the smallest difference being the minimal time for executing the task.

Doing this in such a manner allows us to minimize the time needed for the performance of each task while ensuring the feasibility of the completion of the task.

Next, method 600 determines 630 a AGV motion trajectory as a function of time and space prescribing the AGV to be in a launch location in the reachable set within the launch time span and in a recovery location in the reachable set at the recovery time span subject to a constraint on the difference between the launch time span and the recovery time span. Notably, this approach allows embodiments to determine only ranges for launch time and recovery, then pick the specific locations and/or specific launch and recovery time after solving the AGV motion trajectory.

Having the AGV motion trajectory, method 600 controls 640 the AGV according to the AGV motion trajectory while commanding the UAV to perform the task upon reaching the launch location at the launch time and collecting the UAV in the recovery location at the recovery time. In some implementations, the control 640 only instructs the UAV about specifics of launch and recovery operations, while allowing controllers of the UAV to perform its own control. In alternative implementations, the control system 201a implemented on the AGV performs the controls of the UAVs.

FIG. 6B shows a schematic of the architecture of a decoupled motion planning system where the motion planners of UAVs 680, 681, 682 provide the reachable regions 685 to an AGV motion planner 690. In turn, the AGV motion planner 690 computes AGV trajectory crossing such regions during suitable time periods. The trajectory is then provided 695 to separate UAV motion planners 680, 681, 682 that plan motion to the target and from the target to the AGV rendezvous in the reachable region and in the appropriate time windows.

FIG. 7A shows a schematic illustrating the dependency between the energy budget, energy model, and the task to be performed, with the difference between launch and recovery time spans employed by some embodiments. For example, knowing the dimensions of a reachable set 700 including a target location, the time of flying between target location 750 and the border of the set 700 for the fly-in 710 and fly-out 730 operations depend on energy spent by the UAV and can be calculated based on the energy model as described below. The time 720 for performing the task can be predetermined for the type of the task. Together the sum 740 of the times 710, 720, and 730 can form the minimal difference within launch and recovery time spans allocated for the energy budget.

FIG. 7B shows a schematic of determining different reachable sets of launch and recovery operations according to some embodiments. Indeed, while some implementations determine a single reachable set 700 illustrated in FIG. 7A, some other implementations determine one reachable set 770 for launch operation and another reachable set 770 for recovery of the UAV. Doing it in such a manner adds flexibility employed by joint optimization.

While different embodiments employ different techniques for determining reachable sets, the computation of a general reachable set may be difficult or result in a set that is hard to use in the subsequent determination of the motion plan, e.g., the reachable set may be non-convex or defined by a large number of complicated equations involving both continuous and discrete variables. While determining reachable sets can be done using Lyapunov principles, such a determination still can be challenging.

FIG. 8 shows a schematic illustrating a method for determining a reachable set 800 as an intersection of a Lyapunov stability set 810 defined by a first Lyapunov function and a Lyapunov energy set 820, 830, or 840 defined by a second Lyapunov function, according to some embodiments. Doing this in such a manner allows to separation of flying requirements from energy consumption requirements to simplify the overall computation.

For example, the Lyapunov stability set is determined for a feedback controller of the UAV and flight constraints defining the safe envelope of flight conditions such that the UAV located within the Lyapunov stability set under the control of the feedback controller reaches an equilibrium for a sublevel set of the first Lyapunov function while satisfying the flight constraints. On the other hand, the Lyapunov energy set is determined for a sublevel set of the second Lyapunov function that describes the energy usage of the UAV controlled by the feedback controller according to the energy model of the UAV. The value of the sublevel set selecting between sets 820-840 is determined by the energy budget.

The separation between stability and energy requirements allows for flexibility in energy calculations. For example, in different embodiments, the plurality of tasks includes a first task at a first target location and a second task at a second target location, wherein the Lyapunov stability sets for the first and second tasks are determined based on the same values of the sublevel set of the first Lyapunov function and different values of the sublevel set of the second Lyapunov function.

Indeed, in some embodiments, the Lyapunov stability set is the same for all tasks just with equilibrium varying for different target locations, i.e., the Lyapunov stability set for the first task is determined for the equilibrium aligned with the first target location, and the Lyapunov stability set for the second task is determined for the equilibrium aligned with the second target location. However, the sublevel of the Lyapunov energy set can vary for different tasks.

In addition, the sets' separation allows for consideration of weather conditions while preserving energy budget constraints. For example, in some embodiments, the processor is operatively connected to a database storing the memory is configured to access different sublevel sets of the first Lyapunov function and different sublevel sets of the second Lyapunov function. The embodiments select the sublevel set of the first Lyapunov function allowing stability satisfying the flight constraints for operating the UAV under current weather conditions, and select the sublevel set of the second Lyapunov function in response to collecting the energy budget.

FIG. 9 shows a schematic illustrating the additional flexibility of energy-based reachable sets according to some embodiments. As shown in FIG. 9, while an AGV is constrained to be within reachable set 900 for the launch 910 and recovery 920 operations, between that time, the motion trajectory 930 can leave the reachable set 900 to assist in performing other tasks.

Lyapunov-Based Construction of Reachable Regions (Sets)

While different embodiments employ different techniques for determining reachable sets, the computation of a general reachable set may be difficult, or result in a set that is hard to use in the subsequent determination of the motion plan, e.g., the reachable set may be non-convex or defined by a large number of complicated equations involving both continuous and discrete variables.

FIG. 10 shows a schematic of a method for determining a reachable set under the special assumption of a linear control method for the linear motion of the UAVs according to some embodiments.

The embodiments employ control law 1010 for controlling UAV $$u = K\delta x_a, \ \delta x_a = (x_a - x_s),$$

and the UAV motion described by linear equations 1020

$$\dot{x}_a(t) = Ax_a(t) + Bu_a(t),$$

$$p_a(t) = Cx_a(t),$$

Where $x_s$ is the UAV target and $x_a$ is the UAV state, $u_a$ is the UAV control and the matrices A, B, C are known while K is the control law gain to be chosen by design.

First, the embodiments select feedback gain K such that the closed-loop motion model matrix A+BK is exponentially stable. Specifically, the embodiments determine 1030 K and a first Lyapunov function $$\mathcal{V}_c(\delta x_a) = \delta x_a^\top P_c \delta x_a^\top$$

where such function is recognized to be a special case of a Lyapunov function, such that along the closed-loop trajectories $$\dot{\mathcal{V}}_c(\delta x_a(t)) \leq -\alpha \mathcal{V}_c(\delta x_a(t)),$$

and such that state and input constraints $$\underline{x}_a \leq \delta x_a \leq \bar{x}_a$$

$$\underline{u}_a \leq K\delta x_a \leq \bar{u}_a$$

Are satisfied for states $\delta x_a$ within the stability region described by $$\delta x_a^\top P_c \delta x_a^\top \leq 1$$

Then the embodiments construct the energy usage rate according to the energy model 1040

$$\dot{\mathcal{E}}(t) = x_a(t)^\top Q_e x_a(t) + u_a(t)^\top R_e u_a(t),$$

which enables accounting for energy consumption as a function of velocity and acceleration, and determine 1050 the Lyapunov energy set by constructing the Lyapunov function $$\mathcal{V}_e(\delta x_a) = \delta x_a^\top P_e \delta x_a$$

by computing $P_e$ such that it is also a special type of Lyapunov function and $P_e$ is the solution of the Lyapunov equation $$P_e(A + BK) + (A + BK)^\top P_e = -(Q_e + K^\top R_e K)$$

and such that it is positive semi-definite. In addition, imposing $$\mathcal{V}_e(\delta x_a) \leq \gamma_e$$

the total energy is used to move to $x_s$ from $x_a$ results in an expenditure of energy of less than $g_e$, according to energy consumption rate model.

Accordingly, the reachable set 1060 is an intersection of the stability 1030 and energy 1050. For example, FIG. 8 shows an example of region 810 such that $$\delta x_a^\top P_c \delta x_a^\top \leq 1,$$

where the flight constraints are satisfied and of the region $\mathcal{V}_e(\delta x_a) \leq \gamma_e$, 820-840 that limits the energy to move to target and return from target to $g_e$. As shown in FIG. 8, the energy region changes by increasing or decreasing $g_e$.

FIG. 11 shows a schematic of time calculation for launch and recovery operations according to some embodiments.

Given state $dx_1$ such that $\mathcal{V}(\delta x_1) = \varepsilon_1 \leq 1$, the time to enter into the region of states such that $\mathcal{V}(\delta x) = \varepsilon_2 < \varepsilon_1$ is computed as $$T = -\alpha^{-1} \ln \frac{\varepsilon_2}{\varepsilon_1} \leq \alpha^{-1} \ln \varepsilon_2. \tag{8}$$

Thus, some embodiments use to determine how long is going to take to reach a neighborhood of a task execution target constructed as a level set of the Lyapunov function from the AGV, and conversely how to reach a neighborhood of the AGV from the task execution target. Here $\varepsilon_2$ is selected as a range such that task execution at a target can be executed using the sensors on board of the UAV from range $e_2$. This is used to determine 1110 the time for motion of the AGV between UAV launch and recovery, as follows.

Given a range where the task can be performed $\varepsilon_2{}^T$ the time bound to reach the position to start the task is computed 1120 as $$T^T = \alpha^{-1} \ln \varepsilon_2^T.$$

Similarly, given a range where the landing maneuver of UAV onto AGV can be performed $\varepsilon_2^L$ the time bound to reach AGV landing range from the location of the target of the task execution computed 1140 as $$T^L = \alpha^{-1} \ln \varepsilon_2^L.$$

Then, considering a minimum task execution time 1130 $T_E$, the time between recovery and range 1150 is $T^M = T^E + T^T + T^L$.

FIGS. 12A and 12B show schematics of computation of launch and return commands and trajectories based on reachable regions according to some embodiments. The embodiments launch the UAV from the AGV to a target with state $x_m$, whereas the state includes the target location 1220, when the state of the AGV $x_g$ is 1210 such that $$\mathcal{V}_e(x_g - x_m) \le \gamma_e$$

$$\mathcal{V}_c(x_g - x_m) \le 1$$

And plan an initial motion of the UAV by computing the trajectory 1215

$$\dot{x}_a(t) = A x_a(t) + BK(x_a(t) - x_m),$$

$$p_a(t) = C x_a(t),$$

$$x_a(0) = x_g$$

Similarly, when the UAV is executing task at target 1220, the embodiments command the UAV to return back to the AGV when $$\mathcal{V}_e(x_m - x_g(t + \tau)) \le E(t)$$

$$\mathcal{V}_c(x_m - x_g(t + \tau)) \le 1$$

Where E(t) is the remaining energy on board the UAV, $t \le T$ and T is computed as described above according to the trajectory 1235 connecting the target location 1220 with recovery location 1230 and computed according to $$\dot{x}_a(t) = A x_a(t) + BK(x_a(t) - x_g),$$

$$p_a(t) = C x_a(t),$$

$$x_a(0) = x_m$$

$$x_g = x_g(t + \tau)$$

Computation of Energy Budgets

FIGS. 13A and 13B show schematics of allocating energy budget for performing different tasks by different UAVs according to different embodiments. In the embodiments of FIG. 13A, the UAV is not recharged 1331 and 1332 between the performance of different tasks, and when tasks 1320,

1322, and 1324 from the plurality of tasks are assigned to the UAV; the energy budgets 1330, 1332, and 1332 for performing each of the tasks by the UAV is determined by dividing an energy capacity 1310 of the UAV by a number of the assigned tasks. Additionally or alternatively, when different tasks require different energy, the energy capacity 1310 of the UAV is allocated among the tasks based on their energy requirements.

FIG. 13B shows a schematic of an embodiment allowing for recharging the UAV between the performance of the tasks. In this embodiment, the energy budget for performing the task by the UAV is determined based on a predetermined value of an energy capacity 1310 of the UAV. An example of the predetermined value is the full capacity or a percentage of the full capacity. To that end, the AGV is controlled to charge the UAV between the recovery time of the task and the launch time of subsequent tasks 1342 and 1344 till the energy capacity of the UAV reaches the predetermined value.

FIG. 13C shows a flow chart of a method for determining energy budgets dynamically based on the actual performance of the tasks according to some embodiments. The method includes determining 1350 the current level of the energy capacity of the UAV at the recovery time after performing the task; comparing 1360 the current level of the energy capacity with an energy budget allocated for performing a subsequent task and a distance between the recovery location of the task and the launch location of the subsequent task indicative of charging time for recharging the AUV before performing the subsequent task; and updating 1370 the energy budget and the reachable set of the subsequent task based on the comparison. As a result, the energy budget affects the reachable sets of subsequent tasks allowing the tracking of actual energy spending.

Computation of AGV Trajectory Based on Reachable Regions

Various embodiments determine the AGV motion trajectory by solving an optimization problem minimizing a cost function including a cost of operation of the AGV and a cost of operation of the UAV, to produce the AGV motion trajectory passing through the reachable sets determined for each of the plurality of tasks at appropriate launch and recovery times.

FIG. 14 shows a pseudo-code of an exemplar optimization method employed by some embodiment. The pseudo-code 1400 solves an optimal motion planning problem that imposes that for each target:

(1) There is a first time instant such that the AGV passes in the area where:

a. the target is reached by satisfying constraints if the linear controller is applied, And the target is reached by the UAVs assigned to it with energy usage less than a first threshold, and there is a second time instant, which is larger than the first time instant with an additional a lower bound of the flight time of the UAV to target, with an additional a lower bound of the time the UAV should spend executing task at the target, and a flight duration such that the AGV passes in the area from which:

it is reached from the target by the UAVs by satisfying constraints if the linear controller is applied it is reached by the AGV from the target with energy usage less than a second threshold The two thresholds are selected such that their sum is less than the initial energy of the drone reduced by an amount of energy to be used at the target for task execution purposes. The thresholds can be fixed or determined as part of the optimal motion planning problem. In the pseudo-code 1400, $f_g$ is the motion model of the AGV, F is a terminal cost function and L is a stage, or integrating cost function.

In some embodiments, the thresholds $g_e$ defining the regions is a decision variable in the motion planning problem, subject to limits, so that the regions can expand and contract, causing longer or shorter flights of UAVs, and hence considering in the cost function the cost of operating the UAV In some implementations of the solutions 1400, the optimal motion planning problem is transformed into a numerical problem via time discretization and time scaling, and solved by a numerical optimization solver, such as sequential convex programming or sequential quadratic programming. The result of the solution is an optimal motion trajectory for the AGV, a sequence of control for the AGV that generates such an optimal motion trajectory. The AGV is then controlled to execute such a trajectory either by applying the computed sequence of controls or by providing the computed optimal motion trajectory to a lower-level controller that generates the commands for the AGV to follow said trajectory, while compensating for potential errors in motion of the AGV.

FIG. 15 shows a block diagram of a method for an iterative estimation of the AGV and UAV initial motion trajectories according to some embodiments. The method determines 1510 the reachable sets defined by functions and the regions where constraints are satisfied and energy to launch and recovery satisfies thresholds and computes 1515 the motion of the AGV such that for each target it enters the region where the UAVs can be launched to reach the target while satisfying energy range and flight constraints, and then a suitable amount of time later it is in the region where the UAVs can be recovered from the target to the AGV position while satisfying energy range and flight constraints.

The method controls the AGV to move 1520 according to the computed motion and when the AGV enters the region where the UAVs assigned to target i 1525 can be launched to target i, the UAVs is launched 1540 with instructions and/or control commands causing the UAV to fly 1545 to the target. For example, the UAV's motion to the target after launch is generated according to the closed-loop model of the UAV with the linear controller used to define Lyaponove functions of the reachable sets.

After the UAV performs the task, e.g., he at the second time instant indicative of the end of task execution 1550 the target location, the UAV returns 1555 from target i to the AGV predicted position at the second time instant plus flight time, which is planned to be in the regions to which the UAV can be returned from target i. The UAV motion from the target to the AGV after initiation of return is generated according to the closed loop model of the UAV with the linear controller.

In some embodiments, the trajectories to the target and from the target are initially computed according to the linear controller. However, after the AGV motion has been fixed, the UAV motion trajectories can be further refined with the aim of reducing energy usage and/or increasing the time at the target. Specifically, once the launch time has been determined, the trajectory to the target can be updated by optimizing the energy and time to reach the target according to the UAV motion model $$\min w_t t_m^i + w_e \mathcal{E}(t)$$
$$\text{s.t. } \dot{x}_a(t) = Ax_a(t) + Bu_a(t)$$
$$Hx_a(t) + Lu_a(t)) \leq W$$
$$\dot{\mathcal{E}}(t) = x_a(t)^\top Q_e x_a(t) + u_a(t)^T R_e u_a(t),$$
$$\mathcal{E}(t_m^i) \leq \Gamma_l^i$$
$$x(0) = x_g(t_l^{d(i)})$$
$$x_a(t_m^i) \in x_m^i \oplus \varepsilon_2$$

where the energy usage threshold $G_l^i$ may be the same as previously or changed to achieve additional objectives.

Similarly the return trajectory from the task execution target to the AGV can be re-optimized from the one initially computed by the $$\min w_t \tau + w_e \mathcal{E}(t)$$
$$\text{s.t. } \dot{x}_a(t) = Ax_a(t) + Bu_a(t)$$
$$Hx_a(t) + Lu_a(t)) \leq W$$
$$\dot{\mathcal{E}}(t) = x_a(t)^\top Q_e x_a(t) + u_a(t)^\top R_e u_a(t),$$
$$\mathcal{E}(\tau) \leq \Gamma_r^i$$
$$x(0) = x_m$$
$$x_a(\tau) = x_g(t_r^i + \tau)$$

where the energy usage threshold $$\Gamma_r^i$$

may be the same as previously or where the energy usage threshold changed to account for the differences in launch trajectory energy usage and/or energy usage at target, and to achieve different objectives.

Exemplar Embodiments and Implementations

Decoupling AGV and UAV Planning Using Reachable Sets

In order to decouple the planning of AGV and UAVs the exemplar embodiments ensure that after launch from the AGV, the UAVs can accomplish their mission and return to the AGV within the available battery energy and flight envelope constraints. In what follows embodiments focus on the recovery phase, when the UAV must rendezvous with the AGV, before its battery depletes. The method is also applicable to the launch phase, when the UAV reaches the target launching from the AGV, yet embodiments focus on the recovery because then range is a critical constraint. In what follows embodiments refer to a generic UAV and task execution target, so embodiments drop the indices i, j for simplicity.

The energy usage during flight is known fairly precisely, e.g., can be computed from data on aircraft's pilot operating handbook (POH) by the flight computer or manually using charts, but during task execution it is hard to predict. Thus, embodiments determine the set of states that are reachable from a task execution target position $p_m$ while satisfying flight envelope constraints, for a given return energy budget $\gamma_e < \varepsilon_{max}$, $$\mathcal{R}(p_m, \gamma_e) = \{\bar{x}_a \in \mathbb{R}^{n_a} : \exists t_f < \infty, u_a : [0, t_f] \to \mathbb{R}^m, \tag{9}$$

$$x_a(0) = (p_m, 0), \mathcal{E}(0) = 0, x_a(t_f) = \bar{x}_a,$$

$$\mathcal{E}(t_f) \le \gamma_e, x_a(t) \in \mathcal{X}_a, u_a(t) \in \mathcal{U}_a, \forall t \in [0, t_f]\}.$$

Then, by imposing on the AGV position $$(p_g(t), 0) \in \mathcal{R}(p_m, \gamma_e), \forall t \in [t_1, t_2] \tag{10}$$

where $t_1$, $t_2 \in \mathbb{R}_+$ are given, the embodiments of the invention guarantee that if the UAV starts in an appropriate time interval and with remaining energy at least $\gamma_e$, it can execute a feasible rendezvous trajectory from the task execution target to a stationary flight at the AGV position.

The general reachable set (9) may be hard to compute and the resulting constraint (10), if imposed within optimal control problems, may make their solution challenging. Thus, some embodiments of the invention build more conservative sets, which however are easier to compute and use in optimization.

The general reachable set (3) may be challenging to compute, and imposing the resulting constraint (3) in an optimal control problem may make its solution challenging. Thus, embodiments build sets that are more conservative but easier to compute and use in optimization.

Reachable Set Construction

Reachability can be computed efficiently for several classes of sets such as polyhedra, ellipsoids, (constrained) zonotopes. However, some classes are easier to use than others for optimal trajectory generation. Ellipsoids have a compact representation based as a single convex constraint, which make them suitable for optimization. The embodiments of the invention design a fixed linear UAV control law $$u = K\delta x_a, \delta x_a = (x_a - x_s), \tag{11}$$

where $x_s = (p_s, 0)$ is the desired equilibrium, resulting in the asymptotically stable closed-loop dynamics $$\delta \dot{x}_a(t) = (A + BK)\delta x_a = A_{cl}\delta x_a. \tag{12}$$

Let $$\mathcal{V}_c(\delta x_a) = \delta x_a^\top P_c \delta x_a^\top, P_c \succ 0$$

be a Lyapunov function for the closed-loop (12), the embodiments of the invention determine $\gamma_c$ such that the sublevel set $\mathcal{S}_c = \{\delta x_a : \mathcal{V}_c(x_a) \le \gamma_c\}$ satisfies $\mathcal{S}_c \subseteq \{\delta x_a : \delta x_a \in \mathcal{X}_a, K\delta x_a \in \mathcal{U}_a\}$. Then, $$\mathcal{R}_c(p_m) = \{x_a = (p_a, 0) : (x - x_a)^\top P_c(x - x_a) \le \gamma_c, x = (p_m, 0)\}, \tag{13}$$

is the set of equilibria $(p_a, 0)$ that are reachable from initial state $(p_m, 0)$ by control law (11) without violating state or input constraints.

Some embodiments compute $P_c \succ 0$ by finding a controller K and a matrix $P_c \succ 0$ that satisfy the exponentially stabilizing Lyapunov linear matrix inequality $$AS + SA^\top + BY + Y^\top B^\top + \alpha S \preceq 0, \tag{13a}$$

where $$S = P_c^{-1}$$

and Y=KS. Some embodiments of this invention select $\gamma_c = 1$ and require $$\mathcal{S}_c = \{\delta x_a : \delta x_a^T P_c \delta x \le 1\} \subseteq \{\delta x_a : \|v_a\|^2 \le v_{max}^2, \|K\delta x_a\|^2 \le a_{max}^2\}$$

by also imposing that the controller K and the matrix $P_c \succ 0$ satisfy $$0 \preceq \begin{bmatrix} S & SG_c^T \\ G_c S & v_{max}^2 I \end{bmatrix}, 0 \preceq \begin{bmatrix} S & Y^T \\ Y & a_{max}^2 I \end{bmatrix}, \tag{13b}$$

where $G_c$ selects the appropriate rows for enforcing the velocity bound.

Some embodiments of the present inventions construct $P_c$ and K by solving the exponentially stabilizing semidefinite program that maximizes the volume of the reachable set $\mathcal{S}_c$ $$\max_{S,Y} \log \det S \tag{13c}$$

$$\text{s.t. } (13a), (13b)$$

and then selecting $P_c = S^{-1}$ and $K = YS^{-1}$,

The reachable set within a given energy budget is computed follows. The energy consumed by the close-loop dynamics (11) to reach a given equilibrium $x_s$ from initial state $x_a$ is $$V_e(\delta x_a) = \int_0^\infty \dot{\mathcal{E}}(t)dt \le \gamma_e. \tag{14}$$

Then, the sublevel set $\mathcal{S}_e = \{\delta x_a : \mathcal{V}_e(\delta x_a) \le \gamma_e\}$ includes trajectories with energy usage less than $$\gamma_e \cdot V_e(\delta x_a) = \delta x_a^T P_e \delta x_a$$

where $P_e \succ 0$ is the solution of the autonomous system Lyapunov equation $P_e(A+BK) + (A+BK)^T P_e = -(Q_e + K^T R_e K)$. Thus, $$\mathcal{R}_e(p_m, \gamma_e) = \{x_a = (p_a, 0) : (x - x_a)^T P_e(x - x_a) \le \gamma_e, \tag{15}$$

$$x = (p_m, 0)\},$$

is the set of equilibria reached from initial state $(p_m, 0)$ by the control law with energy expenditure less than $\gamma_e$.

The set $$\mathcal{R}_K(p_m, \gamma)_e = \mathcal{R}_e(p_m, \gamma_e) \cap \mathcal{R}_c(p_m), \qquad (16)$$

is invariant, since for any $\delta x_a \in \mathcal{S}_c \cap \mathcal{S}_e$, $\mathcal{V}_c(A_{cl}\delta x_a) \leq \mathcal{V}_c$ $(\delta x_a)$, and $\mathcal{V}_e(A_{cl}\delta x_a) \leq \mathcal{V}_e(\delta x_a)$ due to the integral in (14), so that $A_{cl}\delta x_a \in \mathcal{R}_e(p_m, \gamma_e) \cap \mathcal{R}_c(p_m)$. Then, the constraint $$(p_g, 0) \in \mathcal{R}_K(p_m, \gamma_e), \qquad (17)$$

determines a set of rendezvous positions for the UAV with the AGV, such that the UAV trajectories from stationary flight at the task execution target position $p_m$ to equilibria in such positions satisfy flight envelope constraints and energy budget. The embodiments of the invention consider the rendezvous position as the AGV velocity may briefly stop to allow landing, or the UAV may simply perform a landing on a moving platform.

Using the exponential stability of $\mathcal{V}_c$ the embodiments of the invention bound the time for the UAV to reach a neighborhood of the equilibrium, where the rendezvous occurs. Since $\delta x_a(t)^T P \delta x_a(t) \leq 1$ for all $t \in \mathbb{R}_{0+}$, $\mathcal{V}_c(\delta x_a(t)) \leq \mathcal{V}_c(\delta x_a(0))e^{-\alpha t} \leq e^{-\alpha t}$. Then, for any $\epsilon \in \mathbb{R}_{(0,1)}$ $$T_{rec} = -\alpha^{-1} \ln \epsilon, \qquad (18)$$

is the upper bound to the time to achieve $\mathcal{V}_c(\delta x_a) \leq \epsilon$, that defines the acceptable rendezvous region for E small enough.

Trajectory Optimization for AGV

Leveraging the reachable set constraints, embodiments can formulate the AGV trajectory generation separately from the UAVs, while ensuring that rendezvous can occur within the range constraints.

As AGV model (2), embodiments use the kinematic bicycle model $$i) \ p_g^x = v_g \cos\theta_g \qquad (19)$$

$$ii) \ p_g^y = v_g \sin\theta_g$$

$$iii) \ \dot\theta_g = \frac{v_g \tan(\delta_g)}{L}$$

$$iv) \ \dot v_g = a_g,$$

where $$\left(p_g^x, p_g^y\right)$$

is the position, $\theta_g$ is the yaw angle, $v_g$ is the velocity, $a_g$ is the acceleration, $\delta_g$ is the front-steering angle, and L is the wheelbase. The state and input vectors are $$x_g = \left[p_g^x, p_g^y, \theta_g, v_g\right]^T, u_g = [a_g, \delta_g]^T, \qquad$$

respectively.

For the AGV constraints (2), embodiments consider $$i) \ X_g = \left\{x_g \colon 0 \leq v_g \leq v_{gmax}\right\}, \qquad (20)$$

$$ii) \ U_g = \left\{u_g \colon |a_g| \leq a_{gmax}, |\delta_g| \leq \delta_{gmax}\right\}.$$

The achievable rendezvous constraint that enforces the AGV to remain inside the reachable set $\mathcal{R}_K(p_m, \gamma_e)$ of the UAV for a time interval is $$i) \ \exists \ t_1^{(j)}, t_2^{(j)} \in [T_0, T_f] \text{ s.t. } (p_g(t), 0) \in_K \left(p_m^{(j)}, \gamma_e^{(j)}\right), \qquad (21)$$

$$ii) \ \gamma_e^{(j)} \leq \gamma_{max}, t_2^{(j)} - t_1^{(j)} \geq T_{min}, \forall \ t \in \left[t_1^{(j)}, t_2^{(j)}\right],$$

where $T_{min} \in \mathbb{R}_+$ is the minimum duration of the rendezvous window. The upper bound to the energy budget for rendezvous $\gamma_{max} < \varepsilon_{max}/2$ is chosen to leave enough energy for launch and task execution.

Summarizing, the free-final-time optimal trajectory generation problem for the AGV that ensures feasibility of the rendezvous as the optimal control problem $$\max_{x_g(\cdot), \ u_g(\cdot), \ \gamma_e^{(j)}, \ T_f} \int_{T_0}^{T_f} J(x_g(t), u_g(t))dt + w_{g\gamma}\sum_{j=1}^{N_m} \gamma_e^{(j)} \qquad (22)$$

$a$) subject to optimal control constraints where the optimal control constraints include the motion model of the AGV (19) the constraints on the AGV motion (20), the initial condition of the AGV $x_g(T_0) = x_{g,s}$, the terminal condition of the AGV $x_g(T_f) = x_{g,f}$, and constraints on the AGV position to be within the region where the UAV can launch and return with available UAV energy and while satisfying UAV constraints, at times where the UAV can reach the AGV position (21), and the AGV obstacle avoidance constraints (8). In some embodiments of the present invention, the energy threshold Ye is a decision variable of the optimal control problem, and the reachable set shrinks and expand based on the chosen energy threshold. Thus, choosing a larger energy thresholds allows more range for the UAV flight and hence allow release and recovery further away from the target, but reduces the energy available for the execution of the task.

The cost function $J \colon \mathbb{R}^{n_g} \times \mathbb{R}^{m_g} \to \mathbb{R}$ includes the completion, i.e., final, time and the input energy, $$J(x_g) = w_{gt} + w_{ge}u_g^T u_g,$$

where $w_{gt}$, $w_{ge}$, $w_{g\gamma} \in \mathbb{R}_+$ are user-defined weights. Constraint (21) involves existential quantifiers for $t_1$ and $t_2$ that is not straightforward to include in numerical optimization. Next, we discuss how to implement it using time scaling.

The cost function $J \colon \mathbb{R}^{n_g} \times \mathbb{R}^{m_g} \to \mathbb{R}$ includes the completion, i.e., final, time and the input energy, $$J(x_g) = w_{gt} + w_{ge}u_g^T u_g,$$

where $w_{gt}$, $w_{ge}$, $w_{g\gamma} \in \mathbb{R}_+$ are user-defined weights.

In order to solve (22) numerically, embodiments discretize it with time scaling. For example, some embodiments use a multiple shooting parameterization ith the adaptive time-mesh $$T_0 = t_0 < t_1 < \ldots < t_N = T_f,$$

where $N \in \mathbb{N}$ is the number of sub-intervals $[t_k, t_{k+1}]$ for $k \in_{[0,N-1]}$, and embodiments introduce time-scaling variables $$s_k = t_{k+1} - t_k.$$

By parametrizing the control as a first-order hold and integrating in the intervals, the dynamics are $$x_{k+1} = f_g^{(d)}(x_k, u_k, u_{k+1}, s_k). \qquad (23a)$$

and the constraints (2) are enforced at node points, $$x_k \in X_g, u_k \in \mathcal{U}_g, p_{g,k} = h_g(x_k, u_k) \notin O^{(o)}, \qquad (23b)$$

for all $o \in \mathbb{Z}_{[1,N_o]}$ and k in $\mathbb{Z}_{[0,N]}$.

To implement the rendezvous constraint (10), embodiments first assign consecutive node points $$\left\{ k_1^{(j)}, k_1^{(j)} + 1, \ldots, k_2^{(j)} \right\}$$

to each task execution target $j \in_{[1,N_m]}$. Then, embodiments formulate (21) as $$\sum_{k=k_1^{(j)}}^{k_2^{(j)}-1} s_k \geq T_{min}, \gamma_e^{(j)} \leq \gamma_{max}, \qquad (23c)$$

$$(p_{g,k}, 0) \in_K \left( p_m^{(j)}, \gamma_e^{(j)} \right), k \in_{\left[ k_1^{(j)}, k_2^{(j)} \right]}.$$

In (23c), even if $$k_1^{(j)}, k_2^{(j)}$$

are specified, the time instants $$t_1^{(j)} \text{ and } t_2^{(j)}$$

are not fixed, since $s_k$ is a decision variable.

Thus, the discrete-time formulation of (4) is $$\max_{x_k, u_k, s_k, \left\{ \gamma_e^{(j)} \right\}_j} w_{gt} \sum_{k=0}^{N-1} s_k + w_{ge} \sum_{k=0}^{N} u_k^T u_k + w_{g\gamma} \sum_{j=1}^{N_m} \gamma_e^{(j)} \qquad (24)$$

-continued $$\text{s.t. (23a), (23b), (23c), } k \in \mathbb{Z}_{\left[ k_1^{(j)}, k_2^{(j)} \right]}, j \in \mathbb{Z}_{[1,N_m]}.$$

$$x_0 = x_{g,s}, x_N = x_{g,f}.$$

which can be solved by various methods known in the art.

Launch and Recovery Trajectory Optimization for UAVs

Embodiments, besides generating the UAV recovery trajectories, use the control law to compute the launch instants and launch trajectories, by defining the energy budget to travel to the target and using the task execution target position $$p_m^{(j)}$$

as an equilibrium of the Lyapunov function.

Some embodiments further optimize both the launch and recovery of the UAV trajectories which provide additional time/energy for the task execution activities, and/or less time for re-charging at the AGV. Thus, embodiments formulate optimal control problems for launch and recovery that are guaranteed to be feasible since control law holds the trajectory feasible, and it can be used both as an initial guess and as backup, should the optimization not converge in the available time or encounter numerical issues.

Optimization of UAV Recovery Trajectory

The recovery trajectory planning computes the trajectory of the UAV for returning to the AGV from the task execution target position. Due to the construction in Section 3 such trajectory can be generated easily using the linear control law. Let $$t_{i,j}^r \in \left[ t_1^{(j)}, t_2^{(j)} \right],$$

where $$t_1^{(j)}, t_2^{(j)}$$

are as in (21), the recovery trajectory is generated as the output of $$\dot{x}_a^{(i)}(t) = (A + BK) x_a^{(i)}(t) - BK \left( p_g(t_{i,j}^r), 0 \right) \qquad (25)$$

$$u_a^{(i)}(t) = BK \left( x_a^{(i)}(t) - \left( p_g(t_{i,j}^r), 0 \right) \right)$$

$$x_a^{(j)}(t_{i,j}^e) = \left( p_m^{(j)}, 0 \right)$$

until $$t = t_{i,j}^r, \text{ where } t_{i,j}^e = t_{i,j}^r - T_{rec}$$

is computed according to (8). The task execution operation continues until either $$t < t_{i,j}^e$$

or the remaining energy reaches $$\gamma_e^{(j)},$$

where, if the latter occurs sooner than the former, the UAV idles until $$t_{i,j}^e$$

at the monitoring target, or start the return trajectory earlier than $$t_{i,j}^e$$

and waits idling, possibly on the ground, at the rendezvous location $$p_g(t_{i,j}^r).$$

Due to the construction of the control law and the imposing of constraint (21) on the AGV, the recovery trajectory is guaranteed to achieve the rendezvous condition $\mathcal{V}_c(x_a-(p_g, 0)) \le \epsilon$, while satisfying the flight envelope constraints and within the energy budget $$\gamma_e^{(j)}.$$

Further optimization of the recovery trajectory can be achieved to possibly delaying the departure time and/or minimizing the used energy, hence leaving more time/energy for the monitoring operation. We can generate the optimized trajectory by solving $$\min_{u_a(t), \tilde{t}_{i,j}^e} \quad -w_t^r \tilde{t}_{i,j}^e + w_e^r \mathcal{E}(t_{i,j}^r) \tag{26}$$

$$\text{s.t. } \tilde{t}^e \ge t^e$$

$$(4), (5), (6), (7)$$

$$x_a^{(i)}(\tilde{t}^e) = (p_m^{(j)}, 0)$$

$$\mathcal{V}_c(x_a^{(i)}(t_{i,j}^r) - x_g(t_{i,j}^r)) \le \epsilon$$

$$\mathcal{E}(\tilde{t}_{i,j}^e) = 0, \mathcal{E}(t_{i,j}^r) \le \gamma_e^{(j)},$$

where $$w_t^r, w_e^r \in \mathbb{R}_{++}$$

are user-defined weights. Problem (26) is guaranteed to have a feasible solution because the solution computed by (5.1) is feasible, with $$\tilde{t}_{i,j}^e = t_{i,j}^e.$$

With the newly computed departure time $\tilde{t}^e$ and energy $\mathcal{E}(t^r)$, the UAV can operate for longer at the monitoring location.

Optimization of UAV Launch Trajectory

The launch trajectory for the UAV starts from the AGV position $p_g$, reaches the target position $$p_m^{(j)}$$

and its energy usage must be smaller than $\varepsilon_{max}-\gamma_{max}$, to save some energy for monitoring. This may be achieved by choosing $t^l$ to avoid releasing the UAV when too far from target, e.g., according to the scenario and AGV trajectory.

Given the launch time $$t_{i,j}^l,$$

the optimization of the launch trajectory is formulated as $$\min_{x_a(\cdot), u_a(\cdot), t_{i,j}^b} \quad w_t^l t_{i,j}^b + w_e^l \int_{t^l}^{t^b} \mathcal{E}(t) dt \tag{27}$$

$$\text{s.t. } (4), (5), (6), (7)$$

$$x_a(t_{i,j}^l) = (p_g(t_{i,j}^l), v(t_{i,j}^l)),$$

$$x_a(t_{i,j}^b) = (p_m^{(j)}, 0),$$

where $v=(v_g \sin \theta_g, v_g \cos \theta_g)$ is the AGV velocity vector. The cost function in (27) aims at minimizing the flight time and the energy with user-defined weights $$w_t^l, w_e^l \in \mathbb{R}_+.$$

The problem in (27) is a free-final-time optimal control problem subject to convex state and input constraints.

Trajectory Generation and Execution Summary

An exemplar solution of a decoupled method for AGV-UAV trajectory generation is provided below.

Parameters: $\gamma_{max}$, $c_1$, $c_2$, $\mathcal{X}_g$, $\mathcal{U}_g$, $\mathcal{X}_a$, $\mathcal{U}_a$ Data:

$$p_m^{(j)}$$

for all $j \in \mathbb{Z}_{[0,N_m]}$, $\mathcal{O}^{(o)}$, for all $$o \in \mathbb{Z}_{[0,N_o]}, x_{g,f}, T_0, x_g(T_0) = x_a^{(i)}(T_0) = x_{g,s}$$

for all $i \in \mathbb{Z}_{[0,N_a]}$,

Construct $\mathcal{R}_K$, $T_{rec}$, K by (16),
Compute $T_f$, $$\gamma_e^{(j)}, t_{i,j}^r$$

for all $j \in \mathbb{Z}_{[1,N_m]}$, $i \in \mathbb{Z}_{[1,N_a]}$, $(x_g(t), u_g(t))$ for $t \in [T_0, T_f]$
  Compute updated $$\gamma_e^{(j)}, t_{i,j}^e \text{ and } \left(x_a^{(i)}(t), u_a^{(i)}(t)\right)$$

for $$t \in \left[t_{i,j}^e, t_{i,j}^r\right],$$

for all $j \in \mathbb{Z}_{[1,N_m]}$, $i \in \mathbb{Z}_{[1,N_a]}$
Compute $$t_{i,j}^l, t_{i,j}^b \text{ and } \left(x_a^{(i)}(t), u_a^{(i)}(t)\right)$$

for $$t \in \left[t_{i,j}^l, t_{i,j}^b\right],$$

for all $j \in \mathbb{Z}_{[1,N_m]}$, $i \in \mathcal{R}_{[1,N_a]}$
  Execute AGV trajectory $x_g(t)$ for $t \in [T_0, T_f]$ i=1: $N_a$
j=1:$N_m$
  Launch UAV i to target j at $$t_{i,j}^l$$

and execute $$x_a^{(i)}(t)$$

for $$t \in \left[t_{i,j}^l, t_{i,j}^b\right]$$

$$t \in \left[t_{i,j}^l, t_{i,j}^b\right[ \text{ and } \varepsilon^{(i)} \le \varepsilon_{max} - \gamma_e^{(j)}$$

Execute task at target j with UAV i
  Return UAV i to AGV by $$x_a^{(i)}(t)$$

for $$t \in \left[t_{i,j}^e, t_{i,j}^r\right]$$

FIG. 16 illustrates a block diagram 1600 of a controller 1601 for the exemplar UAV 1200 according to an exemplary embodiment. The exemplar UAV comprises the controller 1601 for controlling the exemplar UAV 1200. As shown in FIG. 16, the controller 1601 of the UAV 1200 according to an exemplary embodiment may be a computer, a mobile phone, a digital broadcast terminal, a messaging device, a game console, a tablet device, a medical device. Equipment, fitness equipment, personal digital assistants, drone controllers, etc. The controller 1601 includes a processing component 1603, a memory 1605, a power component 1607, a multimedia component 1609, an audio component 1611, an input/output (I/O) interface 1613, a sensor component 1615, and a communication component 1617. The processing component 1603 typically controls the overall operation of the controller 1601, such as operations associated with display, telephone calls, data communications, camera operations, and recording operations. The processing component 1603 can include one or more processors to execute instructions to perform all or part of the steps of the above-described methods. Moreover, processing component 1603 can include one or more modules to facilitate interaction between the components. For example, the processing component 1603 can include a multimedia module to facilitate interaction between the multimedia component 1609 and the processing component 1603. The memory 1605 is configured to store various types of data to support operation at the controller 1601. Examples of data include instructions for any application or method operating on the controller 1601, contact data, phone book data, messages, pictures, videos, and the like. The memory 1605 can be implemented by any type of volatile or non-volatile storage device, or a combination thereof, such as static random access memory (SRAM), electrically erasable programmable read-only memory (EEPROM), or erasable. Programmable Read Only Memory (EPROM), Programmable Read Only Memory (PROM), Read Only Memory (ROM), Magnetic Memory, Flash Memory, Disk or Optical Disk. The power component 1607 provides power to various components of controller 1601. Power component 1607 can include a power management system, one or more power sources, and other components associated with generating, managing, and distributing power for controller 1601.

The multimedia component 1609 includes a screen between the controller 1601 and the user that provides an output interface. In some embodiments, the screen can include a liquid crystal display (LCD) and a touch panel (TP). If the screen includes a touch panel, the screen can be implemented as a touch screen to receive input signals from the user. The touch panel includes one or more touch sensors to sense touches, slides, and gestures on the touch panel. The touch sensor may sense not only the boundary of the touch or sliding action, but also the duration and pressure associated with the touch or slide operation. In some embodiments, the multimedia component 1609 includes a front camera and/or a rear camera. When the controller 1601 is in an operation mode, such as a shooting mode or a video mode, the front camera and/or the rear camera can receive external multimedia data. Each front and rear camera can be a fixed optical lens system or have focal length and optical zoom capabilities. The audio component 1611 is configured to output and/or input an audio signal. For example, the audio component 1611 includes a microphone (MIC) that is configured to receive an external audio signal when the controller 1601 is in an operational mode, such as a call mode, a recording mode, and a voice recognition mode. The received audio signal may be further stored in memory 1605 or transmitted via communication component 1617. In some embodiments, the audio component 1611 also includes a speaker for outputting an audio signal. The I/O interface 1613 provides an interface between the processing component 1603 and a peripheral interface module, which may be a keyboard, a click wheel, a button, or the like. These buttons may include, but are not limited to, a home button, a volume button, a start button, and a lock button.

The sensor component 1615 includes one or more sensors for providing various aspects of state assessment for controller 1601. For example, sensor component 1615 can detect an open/closed state of controller 1601, relative positioning of components, such as the display and keypad of controller 1601, and sensor component 1615 can also detect a change in position of one component of controller 1601. The presence or absence of user contact with controller 1601, controller 1601 orientation or acceleration/deceleration, and temperature change of controller 1601. The sensor component 1615 may include proximity transmission A sensor configured to detect the presence of nearby objects without any physical contact. The sensor component 1615 can also include a light sensor, such as a Complementary Metal-Oxide Semiconductor (CMOS) or Charge Coupled Device (CCD) image sensor, for use in imaging applications. In some embodiments, the sensor component 1615 can also include an acceleration sensor, a gyro sensor, a magnetic sensor, a pressure sensor, or a temperature sensor. The communication component 1617 is configured to facilitate wired or wireless communication between controller 1601 and other devices. The controller 1601 can access a wireless network based on a communication standard, such as Wi-Fi, 2G or 3G, or a combination thereof.

In an exemplary embodiment, communication component 1617 receives broadcast signals or broadcast associated information from an external broadcast management system via a broadcast channel. In an exemplary embodiment, the communication component 1617 also includes a near field communication (NFC) module to facilitate short range communication. For example, the NFC module can be implemented based on radio frequency identification (RFID) technology, infrared data association (IrDA) technology, ultra-wideband (UWB) technology, Bluetooth (BT) technology, and other technologies. In an exemplary embodiment, controller 1601 may be implemented by one or more application-specific integrated circuits (ASICs), digital signal processors (DSPs), digital signal processing devices (DSPDs), programmable logic devices (PLDs), field programmable A gate array (FPGA), controller, microcontroller, microprocessor or other electronic component implementation for performing the above methods. In an exemplary embodiment, there is also provided a non-transitory computer-readable storage medium comprising instructions, such as a memory 1605 comprising instructions executable by the processing component 1603 of the controller 1601 to perform the above method. For example, the non-transitory computer-readable storage medium may be a ROM, a random access memory (RAM), a (Compact Disc-Read Only Memory) CD-ROM, a magnetic tape, a floppy disk, and an optical data storage device. Wherein, when the instructions in the storage medium are executed by the processor, the controller 1601 is enabled to perform the control the exemplary UAV 1200.

FIG. 17 illustrates a schematic of a computing device 1700 for implementing the system 201*a* and joint planning methods of the present disclosure, in accordance with an example embodiment. The computing device 1700 includes a power source 1701, a processor 1703, a memory 1705, a storage device 1707, all connected to a bus 1709. Further, a high-speed interface 1711, a low-speed interface 1713, high-speed expansion ports 1715 and low speed expansion ports 1717, can be connected to the bus 1709. In addition, a low-speed expansion port 1719 is in connection with the bus 1709. Further, an input interface 1721 can be connected via the bus 1709 to an external receiver 1723 and an output interface 1725. A receiver 1727 can be connected to an external transmitter 1729 and a transmitter 1731 via the bus 1709. Also connected to the bus 1709 can be an external memory 1733, external sensors 1735, machine(s) 1737, and an environment 1739. Further, one or more external input/output devices 1741 can be connected to the bus 1709. A network interface controller (NIC) 1743 can be adapted to connect through the bus 1709 to a network 1745, wherein data or other data, among other things, can be rendered on a third-party display device, third party imaging device, and/or third-party printing device outside of the computing device 1700.

The memory 1705 can store instructions that are executable by the computing device 1700 and any data that can be utilized by the methods and systems of the present disclosure. The memory 1705 can include random access memory (RAM), read only memory (ROM), flash memory, or any other suitable memory systems. The memory 1705 can be a volatile memory unit or units, and/or a non-volatile memory unit or units. The memory 1705 may also be another form of computer-readable medium, such as a magnetic or optical disk.

The storage device 1707 can be adapted to store supplementary data and/or software modules used by the computing device 1700. The storage device 1707 can include a hard drive, an optical drive, a thumb-drive, an array of drives, or any combinations thereof. Further, the storage device 1707 can contain a computer-readable medium, such as a floppy disk device, a hard disk device, an optical disk device, or a tape device, a flash memory or other similar solid-state memory device, or an array of devices, including devices in a storage area network or other configurations. Instructions can be stored in an information carrier. The instructions, when executed by one or more processing devices (for example, the processor 1703), perform one or more methods, such as those described above.

The computing device 1700 can be linked through the bus 1709, optionally, to a display interface or user Interface (HMI) 1747 adapted to connect the computing device 1700 to a display device 1749 and a keyboard 1751, wherein the display device 1749 can include a computer monitor, camera, television, projector, or mobile device, among others. In some implementations, the computing device 1700 may include a printer interface to connect to a printing device, wherein the printing device can include a liquid inkjet printer, solid ink printer, large-scale commercial printer, thermal printer, UV printer, or dye-sublimation printer, among others.

The high-speed interface 1711 manages bandwidth-intensive operations for the computing device 1700, while the low-speed interface 1713 manages lower bandwidth-intensive operations. Such an allocation of functions is only an example. In some implementations, the high-speed interface 1711 can be coupled to the memory 1705, the user interface (HMI) 1747, and to the keyboard 1751 and the display device 1749 (e.g., through a graphics processor or accelerator), and to the high-speed expansion ports 1715, which may accept various expansion cards via the bus 1709. In an implementation, the low-speed interface 1713 is coupled to the storage device 1707 and the low-speed expansion ports

1717, via the bus 1709. The low-speed expansion ports 1717, which may include various communication ports (e.g., Universal Serial Bus (USB), Bluetooth, Ethernet, wireless Ethernet) may be coupled to the one or more external input/output devices 1741. The computing device 1700 may be connected to a server 1753 and a rack server 1755. The computing device 1700 may be implemented in several different forms. For example, the computing device 1700 may be implemented as part of the rack server 1755.

The present disclosure provides the system 201a for controlling the fleet of UAVs. The system 201a determines assignments for one or more UAVS of the fleet of UAVs for delivering a package by performing the multi-stage optimization. In each stage of the multi-stage optimization, different variables pertinent to different participants are optimized. Such a multi-stage optimization ensures correct utilization of the UAVs to provide efficient delivery services. Further, such a multi-stage optimization simplifies the size of each combinatorial problem performed at each stage, thereby the multi-stage optimization is computationally simpler. In other words, complexity involved in performing the multi-stage optimization to schedule and control the UAVs is mitigated/reduced. The embodiments of present disclosure are explained in context of mission service. However, the embodiments of the present disclosure can be applied for other services, such as aerial landscaping services, aerial photography services, surveillance services, and search and rescue services.

The description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine-readable medium. A processor(s) may perform the necessary tasks.

Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Further, embodiments of the present disclosure and the functional operations described in this specification can be implemented in digital electronic circuitry, in tangibly embodied computer software or firmware, in computer hardware, including the structures disclosed in this specification and their structural equivalents, or in combinations of one or more of them. Further some embodiments of the present disclosure can be implemented as one or more computer programs, i.e., one or more modules of computer program instructions encoded on a tangible non transitory program carrier for execution by, or to control the operation of, data processing apparatus. Further still, program instructions can be encoded on an artificially generated propagated signal, e.g., a machine-generated electrical, optical, or electromagnetic signal, which is generated to encode information for transmission to suitable receiver apparatus for execution by a data processing apparatus. The computer storage medium can be a machine-readable storage device, a machine-readable storage substrate, a random or serial access memory device, or a combination of one or more of them.

According to embodiments of the present disclosure the term "data processing apparatus" can encompass all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code.

A computer program can be deployed to be executed on one computer or on multiple computers that are located at one site or distributed across multiple sites and interconnected by a communication network. Computers suitable for the execution of a computer program include, by way of example, can be based on general or special purpose microprocessors or both, and any other kind of central processing unit. Generally, a central processing unit will receive instructions and data from a read only memory or a random access memory or both. The essential elements of a computer are a central processing unit for performing or executing instructions and one or more memory devices for storing instructions and data.

Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship with each other.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

The invention claimed is:

1. A method for controlling an autonomous ground vehicle (AGV) carrying one or multiple unmanned aerial vehicles (UAVs) to perform one or multiple tasks necessitating visiting one or multiple target locations, wherein the method uses a processor coupled with stored instructions implementing the method, wherein the instructions, when executed by the processor carry out steps of the method, comprising:

collecting energy budgets for each of the one or multiple tasks to be performed by each of the one or multiple UAVs;

determining, for each of the tasks based on an energy budget collected for a task and an energy model of a UAV assigned to the task, a reachable set defining a region of space including a target location for performing the task that enables the UAV located in the reachable set to: reach the target location, spend a predetermined energy for performing the task, and exit the reachable set, while staying within the energy budget and operating within a safe envelope of flight conditions;

determining, based on the energy model of the UAV, a difference between a launch time span and a recovery time span of the UAV based on dimensions of the reachable set and time allocated for the performance of the task corresponding to the energy predetermined for the task;

determining an AGV motion trajectory as a function of time and space prescribing the AGV to be in a launch location within the reachable set at a launch time within the launch time span and in a recovery location within the reachable set at a recovery time within the recovery time span subject to constraints, including a constraint on the difference between the launch time span and the recovery time span; and controlling the AGV according to the AGV motion trajectory, while commanding the UAV to perform the task upon reaching the launch location at the launch time and collecting the UAV in the recovery location at the recovery time.

2. The method of claim 1, wherein the reachable set is an intersection of a Lyapunov stability set defined by a first Lyapunov function and a Lyapunov energy set defined by a second Lyapunov function, wherein the Lyapunov stability set is determined for a feedback controller of the UAV and flight constraints defining the safe envelope of flight conditions such that the UAV located within the Lyapunov stability set under the control of the feedback controller reaches an equilibrium for a sublevel set of the first Lyapunov function while satisfying the flight constraints, and wherein the Lyapunov energy set is determined for a sublevel set of the second Lyapunov function describes energy usage of the UAV controlled by the feedback controller according to the energy model of the UAV, wherein a value of the sublevel set is determined by the energy budget.

3. The method of claim 2, wherein the plurality of tasks includes a first task at a first target location and a second task at a second target location, wherein the Lyapunov stability sets for the first and second tasks are determined based on the same values of the sublevel set of the first Lyapunov function and different values of the sublevel set of the second Lyapunov function.

4. The method of claim 3, wherein the Lyapunov stability set for the first task is determined for the equilibrium aligned with the first target location, and wherein the Lyapunov stability set for the second task is determined for the equilibrium aligned with the second target location.

5. The method of claim 4, wherein the processor is operatively connected to a database storing a memory configured to access different sublevel sets of the first Lyapunov function and different sublevel sets of the second Lyapunov function, further comprising:

selecting the sublevel set of the first Lyapunov function allowing stability satisfying the flight constraints for operating the UAV under current weather conditions; and selecting the sublevel set of the second Lyapunov function in response to collecting the energy budget.

6. The method of claim 2, wherein the UAV motion between the launch and target locations and between the target and recovery locations is controlled according to the feedback controller of the UAV that determines the Laypunov stability set associated with constructing the first Lyapunov function.

7. The method of claim 6, wherein the first Lyapunov function is computed together with the feedback controller by solving a convex optimization problem with exponentially stabilizing Lyapunov linear matrix inequality constructed from a motion model of the UAV.

8. The method of claim 7, wherein the exponentially stabilizing linear matrix inequality is solved by an exponentially stabilizing semidefinite program that optimizes the size of the Lyapunov stability set where the constraints on the motion of the UAV are satisfied.

9. The method of claim 7, wherein the matrix inequality constraints impose that the first Lyapunov function achieves exponential stability and provides time bound to reach the position to start the task from the AGV, and the time bound to reach AGV landing range from the location of the target of the task execution.

10. The method of claim 7, wherein the second Lyapunov function is computed by solving an autonomous system Lyapunov matrix equation constructed from a motion model of the UAV and the feedback controller obtained together with the first Lyapunov function.

11. The method of claim 1, further comprising:

assigning tasks from the plurality of tasks to the UAV; and determining the energy budget for performing the task by the UAV by dividing an energy capacity of the UAV by a number of the assigned tasks.

12. The method of claim 1, further comprising:

determining the energy budget for performing the task by the UAV based on a predetermined value of an energy capacity of the UAV; and controlling the AGV to charge the UAV between the recovery time of the task and the launch time of subsequent tasks till the energy capacity of the UAV reaches the predetermined value.

13. The method of claim 1, further comprising:

determining a current level of an energy capacity of the UAV at the recovery time after performing the task;

comparing the current level of the energy capacity with an energy budget allocated for performing a subsequent task and a distance between the recovery location of the task and the launch location of the subsequent task indicative of charging time for recharging the AUV before performing the subsequent task; and updating the energy budget and the reachable set of the subsequent task based on the comparison.

14. The method of claim 1, wherein the UAV is configured to return to the recovery location when a current level of energy remaining at the UAV is less than a level allocated by the energy budget for a recovery path from the target location to the recovery location.

15. The method of claim 14, wherein the UAV is configured to return to the recovery location when a remaining time till the recovery time is less than a flying time allocated for flying along the recovery path.

16. The method of claim 1, further comprising:

determining the AGV motion trajectory by solving an optimization problem minimizing a cost function of time of AGV motion and energy used during the AGV motion subject to the constraints, a cost of operation of the AGV, and a cost of operation of the UAV, to produce the AGV motion trajectory passing through the reachable sets determined for each of the plurality of tasks.

17. The method of claim 16, wherein the constraints include a motion model of the AGV, constraints on the motion of the AGV, initial conditions and terminal conditions for the AGV, constraints on obstacle avoidance of the AGV, and constraints on the AGV position to be within the region where the UAV can launch and return with available UAV energy and while satisfying UAV constraints, at times where the UAV can reach the AGV position.

18. The method of claim 17, wherein the energy budget is optimized within a range that modifies the constraints on the AGV position to be within the in region where the UAV can return at times where the UAV can reach the AGV position.

19. An autonomous ground vehicle (AGV) configured for carrying one or multiple unmanned aerial vehicles (UAVs) to perform one or multiple tasks necessitating visiting one or multiple target locations, wherein the AGV includes a processor coupled with stored instructions, wherein the instructions, when executed by the processor, cause the processor to:

collect energy budgets for each of the one or multiple tasks to be performed by each of the one or multiple UAVs;

determine, for each of the tasks based on an energy budget collected for a task and an energy model of a UAV assigned to the task, a reachable set defining a region of space including a target location for performing the task that enables the UAV located in the reachable set to: reach the target location, spend a predetermined energy for performing the task, and exit the reachable set, while staying within the energy budget and operating within a safe envelope of flight conditions;

determine, based on the energy model of the UAV, a difference between a launch time and a recovery time of the UAV based on dimensions of the reachable set and time allocated for the performance of the task corresponding to the energy predetermined for the task;

determine an AGV motion trajectory as a function of time and space prescribing the AGV to be in a launch location within the reachable set at the launch time and in a recovery location within the reachable set at the recovery time subject to a constraint on the difference between the launch time and the recovery time; and control the AGV according to the AGV motion trajectory, while commanding the UAV to perform the task upon reaching the launch location at the launch time and collecting the UAV in the recovery location at the recovery time.

20. A non-transitory computer-readable storage medium and embodied thereon a program executable by a processor performing a method for controlling an autonomous ground vehicle (AGV) carrying one or multiple unmanned aerial vehicles (UAVs) to perform one or multiple tasks necessitating visiting one or multiple target locations, the method comprising:

collecting energy budgets for each of the one or multiple tasks to be performed by each of the one or multiple UAVs;

determining, for each of the tasks based on an energy budget collected for a task and an energy model of a UAV assigned to the task, a reachable set defining a region of space including a target location for performing the task that enables the UAV located in the reachable set to; reach the target location, spend a predetermined energy for performing the task, and exit the reachable set, while staying within the energy budget and operating within a safe envelope of flight conditions;

determining, based on the energy model of the UAV, a difference between a launch time and a recovery time of the UAV based on dimensions of the reachable set and time allocated for the performance of the task corresponding to the energy predetermined for the task;

determining an AGV motion trajectory as a function of time and space prescribing the AGV to be in a launch location within the reachable set at the launch time and in a recovery location within the reachable set at the recovery time subject to a constraint on the difference between the launch time and the recovery time; and controlling the AGV according to the AGV motion trajectory, while commanding the UAV to perform the task upon reaching the launch location at the launch time and collecting the UAV in the recovery location at the recovery time.

* * * * *